United States Patent
Thies et al.

(10) Patent No.: US 10,021,698 B2
(45) Date of Patent: Jul. 10, 2018

(54) SYSTEMS AND METHODS FOR DELIVERING MESSAGES VIA SMPP BRIDGE FOR MULTIPLE DELIVERY CHANNELS

(71) Applicant: Qwasi, Inc., New York, NY (US)

(72) Inventors: Jon Thies, Malvern, PA (US); Rob Rodriguez, San Jose, CA (US); Karl Montemayor, Santa Clara, CA (US)

(73) Assignee: QWASI, INC., New York, NY (US)

( * ) Notice: Subject to any disclaimer, the term of this patent is extended or adjusted under 35 U.S.C. 154(b) by 0 days.

(21) Appl. No.: 14/528,896

(22) Filed: Oct. 30, 2014

(65) Prior Publication Data

US 2015/0117373 A1     Apr. 30, 2015

Related U.S. Application Data

(60) Provisional application No. 61/897,553, filed on Oct. 30, 2013, provisional application No. 61/904,774, filed on Nov. 15, 2013.

(51) Int. Cl.
*H04W 4/00* (2009.01)
*H04W 72/04* (2009.01)
(Continued)

(52) U.S. Cl.
CPC ......... *H04W 72/0493* (2013.01); *H04L 51/14* (2013.01); *H04L 67/26* (2013.01); *H04W 4/14* (2013.01); *H04L 51/24* (2013.01)

(58) Field of Classification Search
CPC .... H04W 72/0493; H04W 4/14; H04L 51/14; H04L 67/26; H04L 51/24
See application file for complete search history.

(56) References Cited

U.S. PATENT DOCUMENTS

| | | | |
|---|---|---|---|
| 7,630,727 B2 * | 12/2009 | Cai | H04L 51/12 455/404.1 |
| 8,170,580 B2 * | 5/2012 | Dingler | H04W 4/02 455/456.1 |

(Continued)

FOREIGN PATENT DOCUMENTS

WO    WO-2006/101428 A1    9/2006

OTHER PUBLICATIONS

International Search Report and Written Opinion for Application No. PCT/US2014/063215 dated Jan. 28, 2015.

(Continued)

*Primary Examiner* — Phuc Tran
(74) *Attorney, Agent, or Firm* — Foley & Lardner LLP

(57) ABSTRACT

The present disclosure relates to methods and systems for delivering communications to one or more consumer devices via an application provider proxy. A method for delivering and presenting notifications via an application provider proxy includes identifying an occurrence of an event for which a notification is to be delivered to a consumer device. The method also includes identifying a consumer notification policy associated with the consumer device applicable to the notification to be delivered and holding the notification until conditions of the consumer notification policy have been met. The method also includes releasing the notification for presentation at the consumer device upon determining that the rules of the consumer notification policy have been met.

18 Claims, 11 Drawing Sheets

(51) Int. Cl.
*H04W 4/14* (2009.01)
*H04L 29/08* (2006.01)
*H04L 12/58* (2006.01)

(56) References Cited

U.S. PATENT DOCUMENTS

| | | |
|---|---|---|
| 9,143,907 B1 * | 9/2015 | Caldwell ................. H04W 4/14 |
| 2004/0199663 A1 | 10/2004 | Horvitz et al. |
| 2008/0076453 A1 * | 3/2008 | Cai ....................... H04L 51/066 |
| | | 455/466 |
| 2011/0173681 A1 | 7/2011 | Qureshi et al. |
| 2011/0314064 A1 | 12/2011 | Jeyaseelan et al. |
| 2013/0346521 A1 * | 12/2013 | Arabo ............... H04L 29/08693 |
| | | 709/206 |
| 2015/0019654 A1 | 1/2015 | Wheeler et al. |

OTHER PUBLICATIONS

U.S. Office Action on U.S. Appl. No. 14/528,903 dated Jan. 17, 2017.

\* cited by examiner

SYSTEMS AND METHODS FOR DELIVERING MESSAGES VIA SMPP BRIDGE FOR MULTIPLE DELIVERY CHANNELS

RELATED APPLICATIONS

This application claims the benefit of and priority to U.S. Provisional Application No. 61/897,553, entitled "SYSTEMS AND METHODS FOR DELIVERING MESSAGES VIA SMPP BRIDGE FOR MULTIPLE DELIVERY CHANNELS" and filed on Oct. 30, 2013, and to U.S. Provisional Application No. 61/904,774, entitled "SYSTEMS AND METHODS FOR PUSH NOTIFICATION MANAGEMENT" and filed on Nov. 15, 2013, both of which are incorporated herein by reference in their entirety for all purposes.

FIELD OF THE DISCLOSURE

The present application relates generally to managing notifications sent to one or more computing devices and, more particularly, to systems and methods for managing push notifications.

BACKGROUND

For various reasons, many mobile application providers are unable to send push notifications to mobile applications installed on consumer devices. However, these mobile application providers desire to communicate with consumers that have installed mobile applications of the mobile applications providers on their respective consumer devices. Such mobile application providers that desire to send push notifications to consumers face many challenges. For example, for a mobile application provider to send push notifications to the mobile applications installed on respective consumer devices, the mobile application provider may need to create a new mobile application that allows for push notifications. The consumers will then have to install the new updated mobile application after which the consumers can receive push notifications via the mobile application. Moreover, the mobile application provider will need to set up a push notification system through which the mobile application provider can send push notifications. These challenges can be expensive to undertake and time consuming and as such, are not feasible for many mobile application providers.

SUMMARY

Various embodiments disclosed herein are directed to methods and systems for delivering messages received via the Short Message Peer-to-Peer (SMPP) protocol over a plurality of delivery channels are provided. Through these various embodiments, a client can be configured to send messages over an SMPP bridge, which can be processed and delivered to one or more consumers associated with the client over any of a plurality of SMPP-type and non-SMPP type delivery channels. Examples of the various delivery channels include SMS, push notifications, email, instant messaging, and social media application messaging, amongst others. In this way, a client can use the SMPP protocol to send messages using both SMPP-based and non-SMPP based delivery channels.

A message delivery system acting as an intermediary between one or more clients and one or more consumers can be configured to establish a connection with the client via an SMPP protocol. In some implementations, the client may be a company, business or any other entity that may wish to send messages to one or more recipients, such as consumers. The consumers may be current, past or future customers, users, members or subscribers of the client or services provided by the client. The message delivery system can receive, from the client via the SMPP protocol, an SMPP request to deliver a message to at least one of a plurality of consumers. The request can include the message to be delivered and identify a delivery policy according to which the message is to be delivered to one or more consumers. The delivery policy can include one or more rules for delivering the message, including but not limited to identifying one or more target delivery channels through which to deliver the message, identifying a time at which to deliver the message, identifying one or more conditions for delivering the message, for example, a condition requiring that the consumer device be located within a particular geographic region, amongst other rules.

A message delivery system acting as an intermediary between one or more clients and one or more consumers can be configured to establish a connection with the client via an SMPP protocol. The message delivery system can receive, from the client via the SMPP protocol, an SMPP request to deliver a message to at least one of a plurality of consumers. The request can include the message to be delivered and identify a delivery policy according to which the message is to be delivered to one or more consumers. The delivery policy can include one or more rules for delivering the message, including but not limited to identifying one or more target delivery channels through which to deliver the message, identifying a time at which to deliver the message, identifying one or more conditions for delivering the message, for example, a condition requiring that the consumer device be located within a particular geographic region, amongst other rules.

In some implementations, the message delivery system can inspect the request to identify the delivery policy. The message delivery system can then process the request and based on the target delivery channel through which to deliver the message identified in the delivery policy, transmit the message included within the request to the consumer in accordance with the delivery policy. In some implementations, the delivery channel can be a push notification delivery channel through which the message is delivered to a consumer device as a push notification via an application operating on the consumer device. In some implementations, the delivery channel can be a Short Message Service (SMS) delivery channel through which the message is delivered to a consumer device as an SMS message. In some implementations, the delivery channel can be an email delivery channel through which the message is delivered to a consumer device as an email message via a mail application. In some implementations, the delivery channel can be an instant messaging channel through which the message is delivered to a consumer device as an instant message via an instant messaging application.

In some implementations, the message delivery system can be configured to establish an SMPP connection with a client agent operating on a client, over which the message delivery system and the client can communicate. The client agent can be configured to generate an SMPP request that includes the message to be delivered as well as the delivery policy according to which the message is to be delivered. In addition, the message delivery system can be configured to communicate with an application operating on the consumer device through which the message delivery system can send push notifications to the consumer device. In some implementations, the message delivery system can establish a secure connection with the application and deliver push notifications through the secure connection. In some other implementations, the message delivery system can send push notifications through a third-party push notification service that is configured to send the push notification to the application operating on the consumer device. In some such implementations, the message delivery system can send push notifications to social network based applications, for example, Facebook, Twitter, amongst others. In some implementations, the message delivery system can deliver the messages as email messages, instant messages, social network-based messages or posts, amongst others. In some implementations, the message delivery system can deliver the messages as SMS messages. In some implementations, the message delivery system can deliver the messages using more than one delivery channel. In this way, the message delivery system can, for example, deliver an SMS message, an instant message and an email message all in response to a single SMPP request from the client.

In one aspect, the present disclosure is directed to a method for delivering messages received via a short message peer-to-peer (SMPP) protocol over one of a plurality of delivery channels. The method includes establishing, by a message deliverer configured on a device intermediary between a client device and a plurality of consumer devices, a short message peer-to-peer (SMPP) connection with the client device based on SMPP protocol, the SMPP connection for communicating short message service (SMS) messages. The method also includes receiving, by the message deliverer, from the client device over the SMPP connection, a first request, via the SMPP protocol, to deliver a message to at least one consumer device of the plurality of consumer devices. The first request can include the message and a delivery policy specifying one or more non-SMS delivery channels through which to deliver the message. The method further includes identifying, by the message deliverer, from the delivery policy in the first request, the one or more non-SMS delivery channels. The method further includes transmitting, by the message deliverer, for the one or more non-SMS delivery channels, a second request to deliver the message via the one or more non-SMS delivery channels to the at least one consumer device.

In some embodiments, the method includes transmitting, by the message deliverer, for a first non-SMS delivery channel, a corresponding second request to a first entity configured to transmit the message to the consumer device via the first non-SMS delivery channel. In those embodiments, the method can also include transmitting, by the message deliverer, for a second non-SMS delivery channel, another corresponding second request to a second entity configured to transmit the message to the consumer device via the second non-SMS delivery channel.

In some embodiments, one of the non-SMS delivery channels includes one of a) a push notification delivery channel through which the message is delivered to a consumer device as a push notification via an application operating on the consumer device, or b) an instant messaging channel through which the message is delivered to a consumer device as an instant message via an instant messaging application.

In some embodiments, the method includes establishing the SMPP connection with a client agent operating on the client device.

In some embodiments, the at least one consumer device includes an application operating on the recipient consumer device. In those embodiments, the method includes transmitting, by the message deliverer, the message towards the consumer device such that a notification delivery application executing on the consumer device receives the message and responsive to a consumer delivery policy, presents the notification on the consumer device as one of a push notification or an instant message.

In some embodiments, the method further includes inspecting a header of the first request, identifying fields of the header of the first request, and determining, from values of the identified fields, the delivery policy according to which to deliver the message.

In some embodiments, the delivery policy specifies a time at which to deliver the message, or a triggering condition, which when triggered, causes the message to be delivered. In some embodiments, the delivery policy specifies an application executing on the mobile device via which to present the message as a notification on the consumer device. In some embodiments, the delivery policy identifies one or more of a) one or more consumer devices to which the message is to be delivered, b) one or more non-SMS delivery channels according to which the message is to be delivered, or c) a time at which the message is to be delivered.

In some embodiments, the method includes transmitting the second request to a third-party push notification service configured to transmit the message included in the second request to the consumer device for presentation via an application executing on the client device. The application can be specific to the client device.

In one aspect, the present disclosure is directed to a system for delivering messages received via a short message peer-to-peer (SMPP) protocol over one of a plurality of delivery channels. The system includes a message deliverer executing on a device intermediary between a client device and a plurality of consumer devices. The message deliverer includes a memory having processor executable instructions stored thereon and a processor configured to execute the processor executable instructions stored on the memory. The processor is configured to establish a short message peer-to-peer (SMPP) connection with the client device based on SMPP protocol, the SMPP connection for communicating short message service (SMS) messages. The processor is also configured to receive, from the client device over the SMPP connection, a first request, via the SMPP protocol, to deliver a message to at least one consumer device of the plurality of consumer devices. The first request can include the message and a delivery policy specifying one or more non-SMS delivery channels through which to deliver the message. The processor is further configured to identify, from the delivery policy in the first request, the one or more non-SMS delivery channels. The processor is further configured to transmit, for the one or more non-SMS delivery channels, a second request to deliver the message via the one or more non-SMS delivery channels to the at least one consumer device.

In some embodiments of the system, the processor is configured to transmit, for a first non-SMS delivery channel, a corresponding second request to a first entity configured to transmit the message to the consumer device via the first non-SMS delivery channel. In those embodiments, the processor is further configured to transmit, for a second non-SMS delivery channel, another corresponding second request to a second entity configured to transmit the message to the consumer device via the second non-SMS delivery channel.

In some embodiments of the system, the one of the non-SMS delivery channels includes one of a) a push notification delivery channel through which the message is delivered to a consumer device as a push notification via an application operating on the consumer device, or b) an instant messaging channel through which the message is delivered to a consumer device as an instant message via an instant messaging application.

In some embodiments of the system, the processor is configured to establish the SMPP connection with a client agent operating on the client device.

In some embodiments of the system, the at least one consumer device includes an application operating on the recipient consumer device. In those embodiments, the processor is configured to transmit, by the message deliverer, the message towards the consumer device such that a notification delivery application executing on the consumer device receives the message and responsive to a consumer delivery policy, presents the notification on the consumer device as one of a push notification or an instant message.

In some embodiments of the system, the processor is further configured to inspect a header of the first request, identify fields of the header of the first request, and determine, from values of the identified fields, the delivery policy according to which to deliver the message.

In some embodiments of the system, the delivery policy specifies a time at which to deliver the message, or a triggering condition, which when triggered, causes the message to be delivered. In some embodiments of the system, the delivery policy specifies an application executing on the mobile device via which to present the message as a notification on the consumer device. In some embodiments of the system, the delivery policy identifies one or more of a) one or more consumer devices to which the message is to be delivered, b) one or more non-SMS delivery channels according to which the message is to be delivered, or c) a time at which the message is to be delivered.

In some embodiments of the system, the processor is configured to transmit the second request to a third-party push notification service configured to transmit the message included in the second request to the consumer device for presentation via an application executing on the client device, the application specific to the client device According to one aspect, a system for delivering messages received via the SMPP protocol over one of a plurality of delivery channels is provided. A message delivery system acting as an intermediary between a client and a plurality of consumers can be configured to establish a connection with the client via an SMPP protocol. The message delivery system can receive, from the client via the SMPP protocol, a request to deliver a message to at least one of a plurality of consumers. The request can identify a delivery policy according to which the message is to be delivered to the consumer. In some implementations, the message delivery system can inspect the request to identify the delivery policy according to which the message is to be delivered to the consumer. The message delivery system can then process the request and transmit the message included within the request to the consumer in accordance with the delivery policy. In some implementations, the delivery policy can identify a delivery channel over which the message is to be delivered.

Various embodiments disclosed herein are directed to methods and systems for managing and delivering communications to one or more consumer devices via an application provider proxy, such as managing push notifications sent to applications on a consumer's mobile device. The application provider proxy can act as an intermediary to one or more clients and one or more consumer devices. The application provider proxy can be configured to manage and deliver push notifications to one or more consumer devices. In some implementations, the application provider proxy can be configured to communicate with a consumer device via a notification delivery application that can be installed on the consumer device. The application provider proxy can be configured to send push notifications to the notification delivery application. Moreover, the application provider proxy can be configured to exchange communications with the notification delivery application through push and pull requests issued by both the application provider proxy and the notification delivery application.

Many clients that wish to communicate with consumers via the consumer's mobile devices either do so by sending SMS messages, push notifications to mobile applications dedicated to the clients that are installed on the consumer devices, or through other forms of communication, such as email. Clients that either have mobile applications that are unable to receive push notifications or do not have mobile applications are unable to communicate with their consumers via push notifications. The present disclosure enables such clients to establish communications with consumers via their consumer devices using push notifications. In some implementations, the application provider proxy serves as an intermediary between such clients and their consumers and can send push notifications to notification delivery applications installed on the consumers' devices. These push notifications can be generated in response to receiving requests to send communications from such clients. Moreover, these push notifications can trigger an exchange of information between the application provider proxy and the consumer devices such that the consumer devices can take additional actions once the consumer accesses the push notification received on the consumer's device. These actions can include launching one or more third-party applications or services, launching a mobile application of the client, launching a browser and directing the consumer to a particular webpage, amongst others.

The application provider proxy can be configured to communicate with a client of the application provider proxy (for example, a mobile application provider providing mobile applications that are unable to receive push notifications) that wishes to send a push notification or other communication to one or more consumer devices. The client can send a request to the application provider proxy to send a push notification to the consumer device on behalf of the client. For example, the client can request to notify the consumer that their account balance has fallen below a threshold amount by sending a push notification to the consumer device and directing the consumer device to launch a mobile application of the client showing the current account balance upon the consumer accessing the push notification. The application provider proxy can process the request and send a push notification to the notification delivery application installed on the consumer device. Upon receiving the push notification, the notification delivery application can present the notification for display to the consumer. The consumer can access the push notification delivered through the notification delivery application. The notification delivery application can identify that the consumer has accessed the push notification and can process the push notification by performing a pull request for data from the application provider proxy. The application provider proxy in turn can identify the consumer device from which the pull request is received and send additional data or instructions to the notification delivery application of the identified consumer device. These instructions can be based on the request received from the client. In this example, the application provider proxy can identify the consumer and based on the request received from the client, send instructions to the notification delivery application to launch the client's mobile application and show the consumer the consumer's current account balance via the client's mobile application. These instructions can cause the notification delivery application to perform one or more additional actions specified in the instructions. In the example described herein, the notification delivery application can cause the consumer device to launch the client's mobile application and show the consumer the consumer's current account balance. Other examples of actions that the notification delivery application can cause the consumer device to perform include launching a third-party application or service, opening a browser on the consumer device and directing the browser to a particular address provided by the mobile application provider, amongst others.

In some implementations, the application provider proxy can be configured to deliver push notifications to a consumer device according to a notification delivery policy of the consumer device. The notification delivery policy of the consumer device can include one or more rules indicating the manner in which notifications can be delivered to the consumer device. The consumer can specify the rules of the notification delivery policy. Examples of the rules can include delivering notifications only within certain times, delivering notifications when the consumer device is identified to be within a particular geographic area or region, amongst others.

The application provider proxy can communicate with the notification delivery application installed on one or more consumer devices via push notifications. The notification delivery application can be configured to receive the push notifications and take one or more actions responsive to the push notifications. In some implementations, the notification delivery application can be configured to present the notifications at the consumer device in accordance with a consumer notification policy. The consumer notification policy can include one or more rules specifying the manner in which notifications can be presented. The application can be configured to take one or more actions responsive to presenting the notification. In some implementations, the application can be configured to take one or more actions responsive to presenting the notification at the consumer device and receiving a response from a consumer of the consumer device.

The message delivery application installed on the consumer device can receive a notification from the application provider proxy and execute one or more instructions responsive to receiving the notification. In some implementations, the message delivery application can be configured to perform one or more actions in response to a user of the consumer device taking an action in response to the notification received by the consumer device. These actions can correspond to opening a web browser and accessing a web page, opening a third-party application, amongst others.

In some implementations, the application provider proxy may deliver notifications in accordance with a consumer notification policy. The consumer notification policy can include one or more rules identifying a delivery channel through which to deliver the notification, conditions in which to hold the notification and conditions in which to release the notification for presentation, the manner in which the notification is to be presented on the consumer device, amongst others.

In one aspect, the present disclosure is directed to a method for delivering and presenting notifications at a consumer device. The method includes receiving, by a notification manager, from a client device, a notification to be delivered to an application executing on a consumer device. The method also includes holding, by the notification manager, the notification in a notification queue. The method further includes identifying, by the notification manager, a consumer notification policy of the consumer device applicable to the notification, the consumer notification policy specifying one or more conditions for presenting the notification at the consumer device. The method further includes releasing, by the notification manager, from the notification queue, the notification for presentation at the consumer device upon determining that the conditions of the consumer notification policy have been met.

In some embodiments of the method, the notification manager is configured on a device intermediary to the client device and a plurality of consumer devices including the consumer device. In some embodiments, the notification manager is configured on the consumer device.

In some embodiments, the method further includes determining that the conditions of the consumer notification policy have been met. In such embodiments, the method may include identifying one or more conditions of the consumer notification policy, and determining, for at least one of the conditions, that the condition is based on a triggering event. Also in such embodiments, the method may include receiving, by the notification manager, information associated with the triggering event, and determining, from the received information, that the triggering event has occurred.

In some embodiments, the method includes determining a consumer notification policy based on the type of notification to be delivered. In some embodiments of the method, the consumer notification policy includes rules identifying a) a delivery channel through which to deliver the notification, b) one or more conditions in which to hold the notification, c) one or more conditions in which to release the notification for presentation, or d) the manner in which the notification is to be presented on the consumer device. In some embodiments of the method, one or more of the conditions are based on a location of the consumer device, activity performed on the consumer device, or a time associated with the consumer device.

In some embodiments, the method includes receiving third-party data from third-party source corresponding to one or more conditions of the consumer notification policy, and determining, based on the received third-party data, that conditions of the consumer notification policy have been met.

In some embodiments, the method includes storing the notification in a notification database along with a record associated with the notification.

In some embodiments, the method includes delivering, by the notification manager, the notification to a notification delivery application executing on the consumer device, where the notification delivery application presents the notification in accordance with notification presentation rules specified in the consumer notification policy.

In one aspect, the present disclosure is directed to a system for delivering and presenting notifications at a consumer device. The system includes a delivery manager intermediary to a client device and a consumer device. The delivery manager may be configured to receive, from a client device, a notification to be delivered to an application executing on a consumer device and hold the notification in a notification queue. The delivery manager may be also configured to identify a consumer notification policy of the consumer device applicable to the notification, the consumer notification policy specifying one or more conditions for presenting the notification at the consumer device. The delivery manager may be further configured to release, from the notification queue, the notification for presentation at the consumer device upon determining that the conditions of the consumer notification policy have been met.

In some embodiments of the system, the notification manager is configured on a device intermediary to the client device and a plurality of consumer devices including the consumer device. In some embodiments of the system, the notification manager is configured on the consumer device.

In some embodiments of the system, the delivery manager is further configured to determine that the conditions of the consumer notification policy have been met. In such embodiments, the delivery manager is further configured to identify one or more conditions of the consumer notification policy, and determine, for at least one of the conditions, that the condition is based on a triggering event. Also in such embodiments, the delivery manager is further configured to receive information associated with the triggering event, and determine, from the received information, that the triggering event has occurred.

In some embodiments of the system, the delivery manager is further configured to determine a consumer notification policy based on the type of notification to be delivered.

In some embodiments of the system, the consumer notification policy includes rules identifying a) a delivery channel through which to deliver the notification, b) one or more conditions in which to hold the notification, c) one or more conditions in which to release the notification for presentation, or d) the manner in which the notification is to be presented on the consumer device. In some embodiments of the system, one or more of the conditions are based on a location of the consumer device, activity performed on the consumer device, or a time associated with the consumer device.

In some embodiments of the system, the delivery manager is configured to receive third-party data from a third-party source corresponding to one or more conditions of the consumer notification policy. The delivery manager is further configured to determine, based on the received third-party data, that conditions of the consumer notification policy have been met.

In some embodiments of the system, the delivery manager is configured to store the notification in a notification database along with a record associated with the notification.

In some embodiments of the system, the delivery manager is further configured to deliver the notification to a notification delivery application executing on the consumer device, where the notification delivery application presents the notification in accordance with notification presentation rules specified in the consumer notification policy.

According to one aspect, a method for delivering and presenting notifications via an application provider proxy includes identifying an occurrence of an event for which a notification is to be delivered to a consumer device. The method also includes identifying a consumer notification policy associated with the consumer device applicable to the notification to be delivered and holding the notification until conditions of the consumer notification policy have been met. The method also includes releasing the notification for presentation at the consumer device upon determining that the rules of the consumer notification policy have been met.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes a communication platform which may be useful for practicing embodiments described herein.

Section C describes embodiments of systems and methods for delivering messages received via the SMPP protocol over one of a plurality of delivery channels.

Section D describes embodiments of systems and methods for delivering communications via an application provider proxy.

A. Computing and Network Environment

Figure 1A:
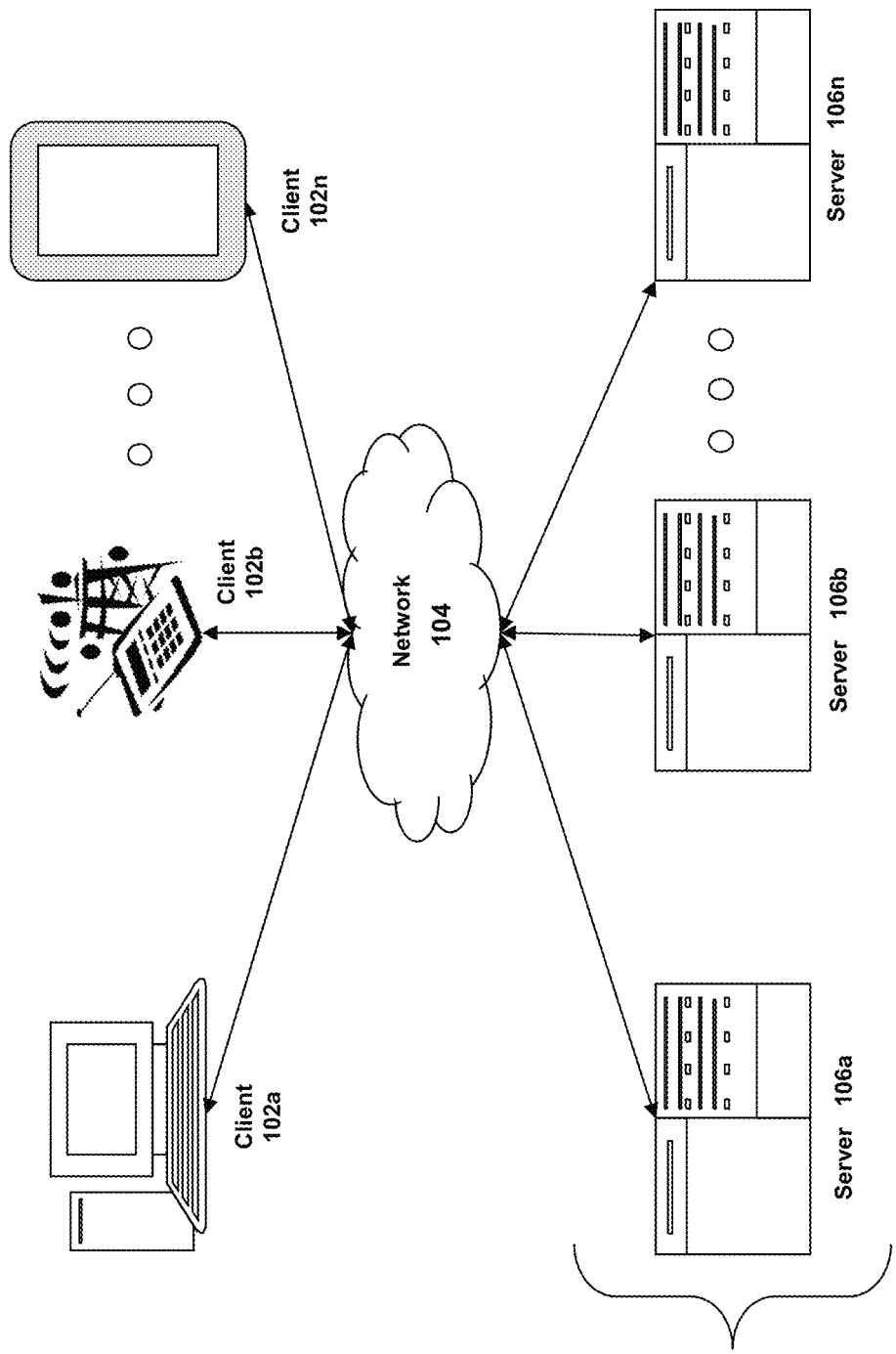
FIG. 1A is a block diagram depicting an embodiment of a network environment comprising local devices in communication with remote devices.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
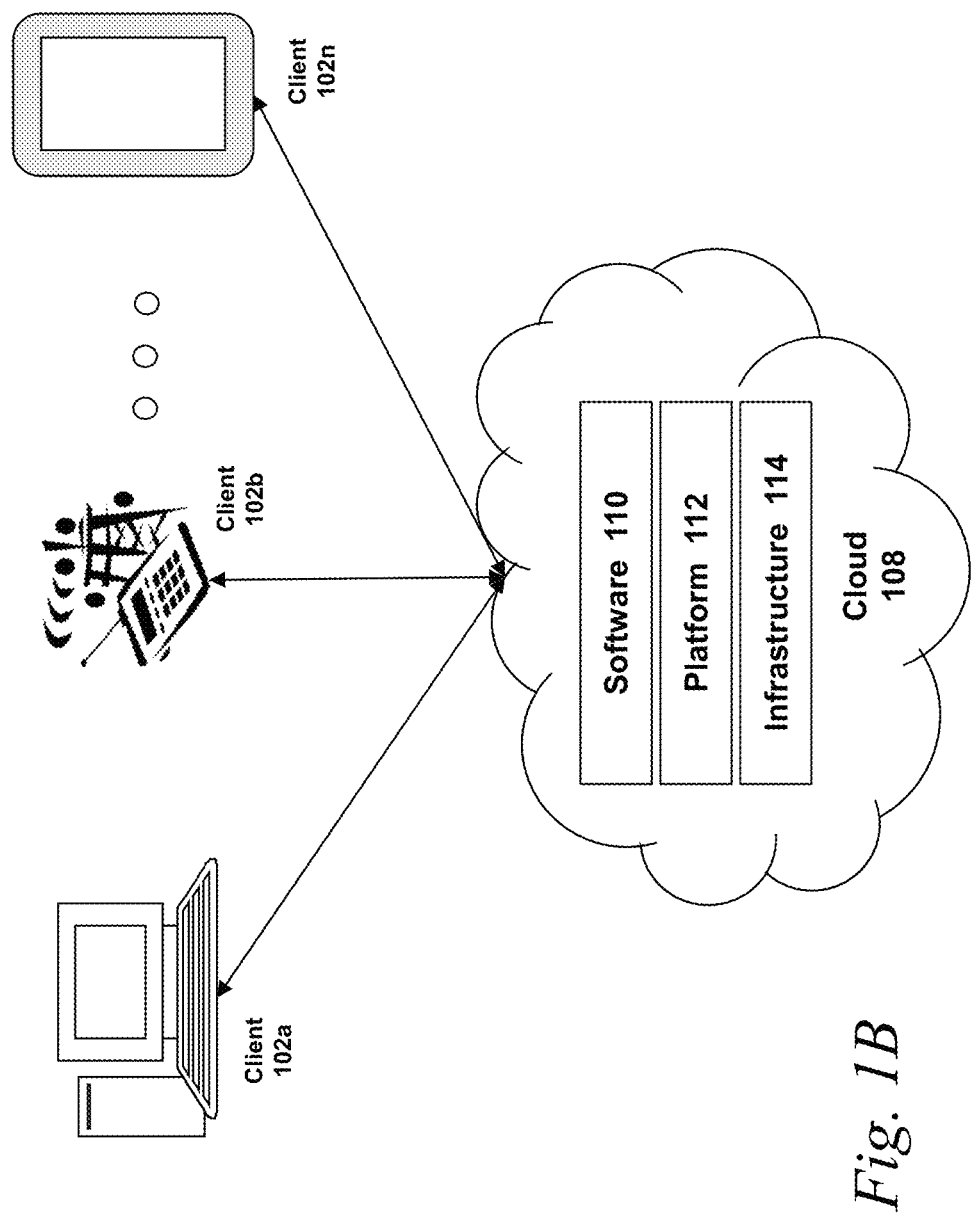
FIGS. 1B-1D are block diagrams depicting embodiments of computers useful in connection with the methods and systems described herein.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
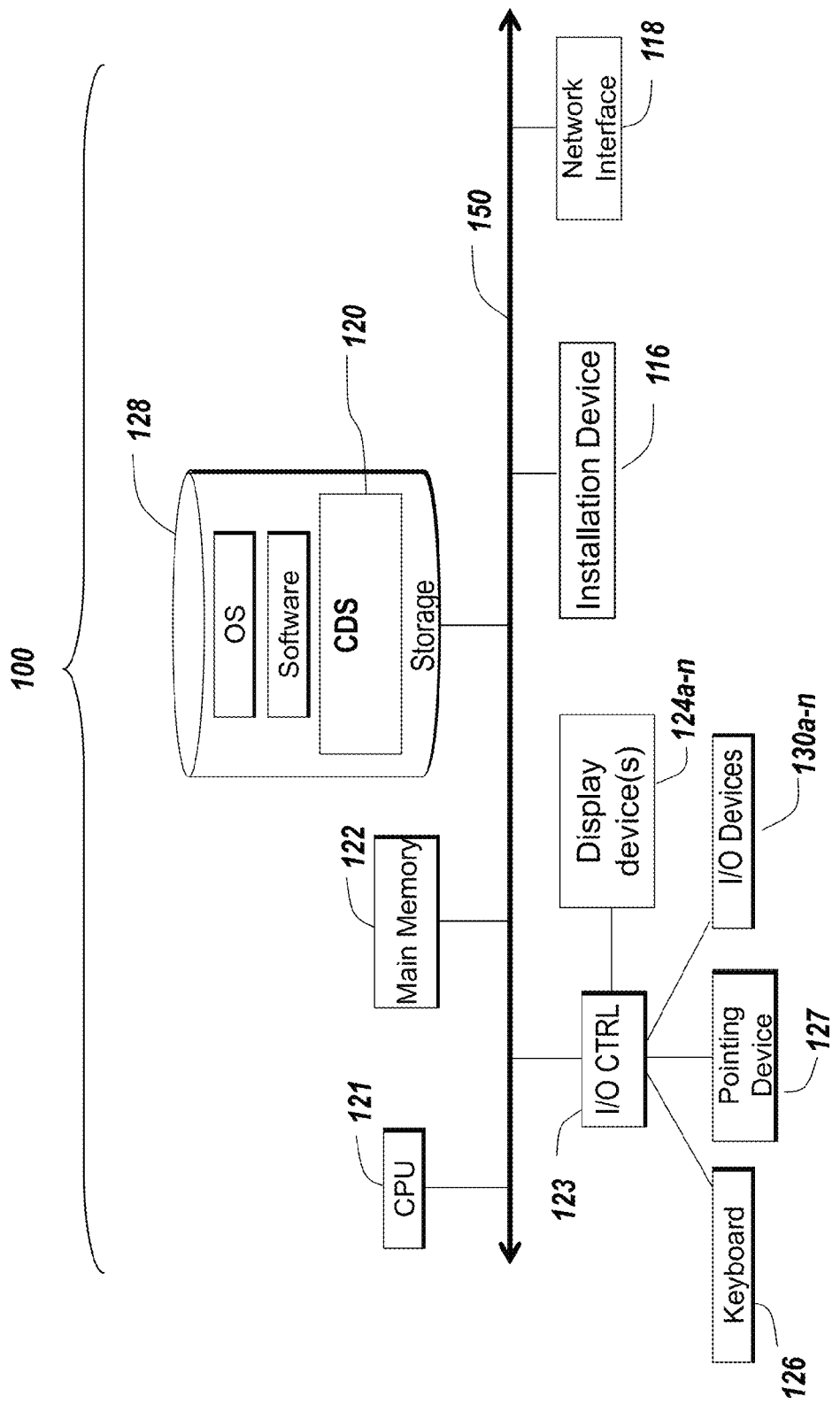
Figure 1D:
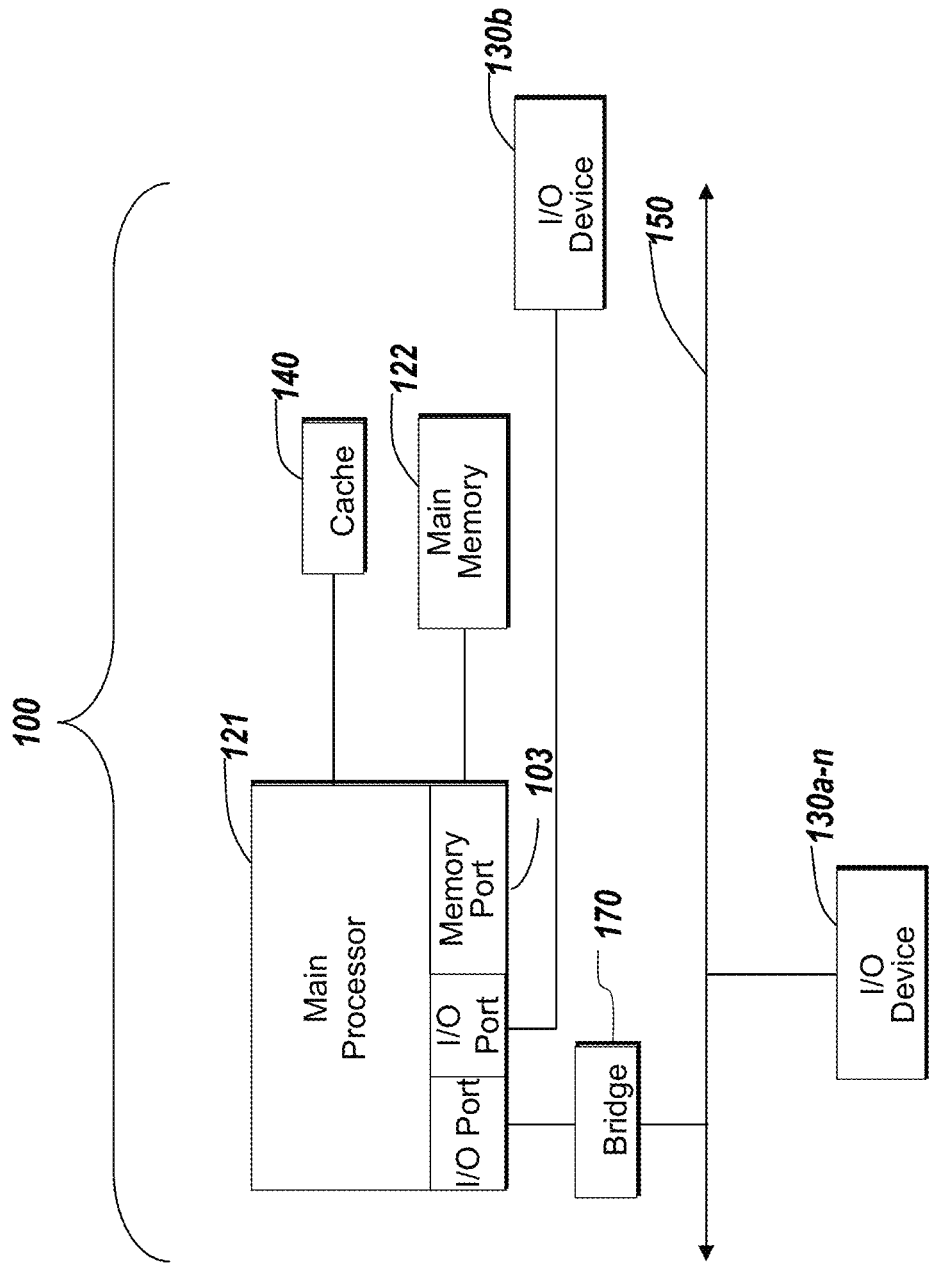

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a content distribution system (CDS) 120, for example, the message delivery system 320 shown in FIG. 3A or the application provider proxy 420 shown in FIG. 4A. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the content distribution system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as a installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

Figure 2A:
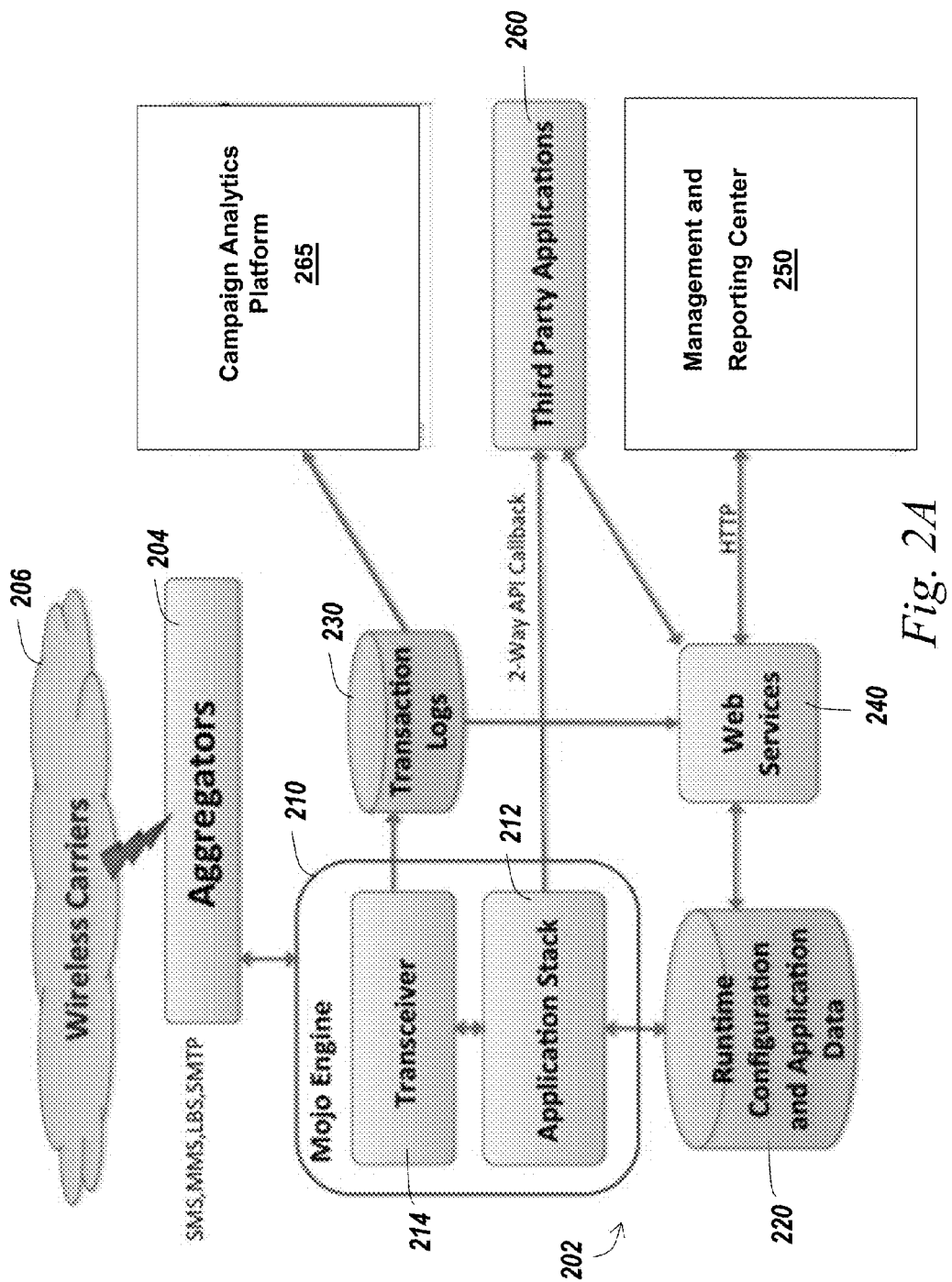
FIG. 2A is a block diagram depicting an environment comprising a communication technology platform useful in connection with the methods and systems described herein.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein B. Communication Technology Platform Referring now to FIG. 2A, a block diagram depicting an environment comprising a communication technology platform useful in connection with the methods and systems described herein is shown. The communication technology platform 202 facilitates the delivery of messages from a client to one or more consumers associated with the client. In particular, the communication technology platform 202 can be configured to receive via an SMPP protocol, a request from the client to send a message to one or more consumers of the client via any of a plurality of delivery channels. In some implementations, the client may be a company, business or any other entity that may wish to send messages to one or more recipients. In some implementations, the consumers may be associated with the client either as current, past or future users, members or subscribers, or through any other form of association in which the client and consumers may communicate with one another.

More generally, when a client wants to send a message to one or more consumers associated with the client, the client may use an application provider, such as the communication technology platform 202 to create a request to send out messages. The application provider can communicate with an aggregator, which in turn can communicate with one or more wireless carriers. The wireless carriers can communicate with the consumer devices associated with the consumers to whom the client would like to send messages. In some implementations, the application provider can be coupled to the aggregator.

In some implementations, a client, such as a company may utilize one or more short codes for marketing or other purposes. The short code can be assigned to a particular application, which oftentimes, is provided by the application provider used by the client.

Each message addressed to an active short code is routed to an application. Although clients can develop and host applications, there are application providers, such as the communication technology platform 202, that may specialize in software development and hosting for mobile messaging applications. Application providers can provide one or more types of applications, such as voting/polling, marketing or gaming.

To use an active short code, the client may need connectivity to the networks of participating wireless carriers, so any message addressed to the active short code can reach the application to which the short code is assigned. In some implementations, the most common method for connecting to a wireless network is Short Message Peer to Peer (SMPP) over a secured virtual private network (VPN) connection.

Aggregators typically have authorized connections to multiple wireless networks. In some implementations, aggregators also maintain the security, technical and service level requirements of each wireless network. Wireless carriers, also sometimes referred to as mobile operators, wireless networks or wireless service providers are the companies from which customers can purchase connection services for their consumer devices, for example, mobile phones.

Referring now again to FIG. 2A, in brief overview, the communication technology platform 202 can be configured to communicate with one or more aggregators 204. The aggregators 204 are configured to send and receive data packets from and to one or more wireless carriers 206. The wireless carriers 206 can communicate with one or more clients and one or more customers of the clients. In some implementations, the aggregator 204 can communicate with one or more clients and customers of the clients via the wireless carriers 206.

The communication technology platform 202 can include a flexible and efficient messaging and application framework 210, a runtime configuration database 220, a transaction database 230 that archives all transactions for analytics and reporting, a set of web services 240 to configure and access application data and a management and reporting center 250 configured to provide a simple user interface.

The communication technology platform 202 can be designed, constructed or configured as a flexible, stable, extensible, high performance platform that can handle a very wide variety of application types. In addition to marketing applications, the communication technology platform 202 may be configured to handle various message-based services. Examples of such message-based services can include feature rich mobile campaign management services, image transmission services via Multimedia Messaging Service (MMS), social applications via one or more social networks or social media applications (for example, Facebook and Twitter), text-based services for ordering products, location-based services and other third-party applications that send or receive messages (for example, online trading applications to customer relationship management (CRM) applications).

The messaging and application framework 210 may be the core of the communication technology platform 202. The framework 210 can include two discrete components—an application stack 212, which can be an efficient, configurable application management framework and a message processor 214, such as a transceiver.

The message processor 214 can be configured to parse incoming messages received by the aggregator to identify the message type, carrier, sender, short code and the message content. The application stack 212 can be configured to process the parsed message to determine which application will handle the message. The application may be internal to the application stack or related to a third party application or system. Once the application is identified and accessed, the message processor 214 can send a response, while the application stack 212 can change states to receive the next message from the same sender in a structured conversation.

The messaging and application framework 210 can handle streams of messages from multiple carriers on multiple short codes in relation to multiple applications. For every application, the messaging and application framework 210 maintains the context of each individual interaction in readiness for the next incoming message in that thread. The application stack 214 can manage a very large number of applications at very high speed without losing context. Additional details of the application stack 214 are provided below with respect to FIG. 2B.

The runtime and configuration database 220 can be designed, constructed or configured to maintain contextual data to facilitate the initiation of interactions for any application and to maintain the status of the interaction thereafter. The runtime and configuration database 220 can also be configured to include data generated by such applications.

The transaction log database 230 can be designed, constructed or configured to maintain a log of transactions handled by the messaging and application framework 210. In some implementations, there can be a deliberate separation between the runtime transaction system that the messaging and application framework 210 provides and the analytics subsystem. This is so the analytics processing on the system can be run at any time without impacting the runtime system's performance.

The web services 240 can be designed, constructed or configured to control access to the runtime and configuration database 220, to one or more third party applications 260 and to the management and reporting center 250. In this way, the web services 240 can enable third party applications 260 to access data associated with the applications within the application stack 210 and can enable the management and reporting center 250 to set application data and construct reports of the activities of the one or more applications within the application stack 210. In some implementations, the web services 240 can be a web services Application Programming Interface (API).

The management and reporting center 250 can be designed, constructed or configured as a flexible platform that enables management and reporting functions to be optimized for different application types. The management and reporting center can be configured to allow clients to build, manage and analyze mobile marketing campaigns. The management and reporting center 250 can be configured to provide several configurable options, including but not limited to branding and multi-tiered account management, reporting and billing. These options can be used in part to allow marketing service providers to easily incorporate mobile marketing services into their portfolio of customer offerings. The management and reporting center 250 can also be configured to interface with a standard two-way API for custom integration with other web services. In some implementations, the management and reporting center 250 and the web services 240 can be configured to communicate over an application layer protocol, for example, HTTP or HTTPS.

Figure 2B:
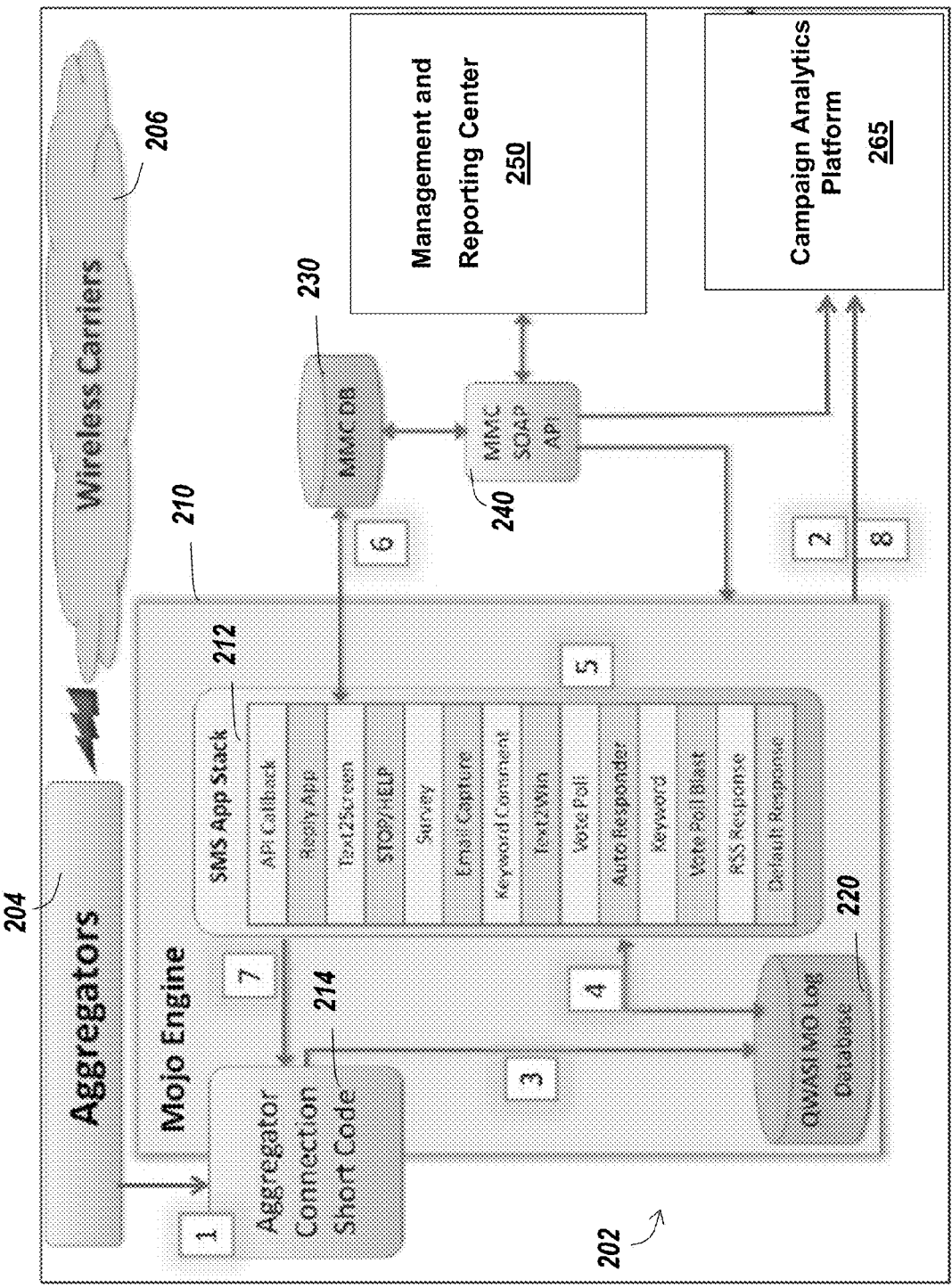
FIG. 2B depicts a process flow associated with the communication technology platform.

One of the common applications of the communication technology platform 202 is in the context of a mobile marketing campaign (MMC), in which the communication technology platform 202 allows for management and reporting of mobile campaigns. FIG. 2B depicts a process flow associated with a mobile marketing campaign managed by the communication technology platform. In brief overview, the communication technology platform 202 can exchange messages with clients and customers of the clients via the aggregator 204, which communicates with the clients and customers via the wireless carriers.

The communication technology platform 202 can include the messaging and application framework 210, the runtime configuration database 220 shown as a mobile originated log database, the transaction database 230 shown as the mobile marketing campaign (MMC) database, a set of web services 240 shown as a mobile marketing campaign Simple Object Access Protocol (SOAP) API, and the management and reporting center 250 shown as a mobile marketing center.

In some implementations, campaign information can stored in the MMC database 230 using the MMC SOAP API

240. In some implementations, clients can choose to use an MMC Graphical User Interface (GUI) or programmatically configure the campaigns using APIs within their own managed applications.

A basic flow for a mobile marketing campaign, for example, an SMS campaign, handled by the communication technology platform 202 can be summarized in accordance with a series of steps shown in FIG. 2B. As depicted in step 1 of FIG. 2B, the messaging and application framework 210 receives a MO (Mobile Originated) message from a wireless carrier 206 via the aggregator 204. The message includes information associated with the sender, recipient (for example, a short code associated with the recipient), carrier, message body, and message type (for example, SMS, MMS, LBS). As depicted in step 2 of FIG. 2B, the messaging and application framework 210 can be configured to log the raw MO content in the into a campaign analytics platform 265 of the messaging and application framework 210. As depicted in step 3 of FIG. 2B, the messaging and application framework 210 requests and retrieves any previous application context information associated with the sender and recipient from the runtime and configuration database 220.

As depicted in step 4 of FIG. 2B, the application stack 212 receives information associated with the message and reviews the message body. In some implementations, the information associated with the message is stored in the runtime and configuration database 220. In some implementations, each application in the application stack 212 may be given the opportunity to review the message body and determine if it should be that application to handle the message. Examples of applications include an API callback application, a reply application, a text2screen application, a STOP/HELP application, a survey application, an email capture application, a keyword comment application, a text2win application, a vote poll application, an auto responder application, a keyword application, a vote poll blast application, an RSS response application and a default application amongst others. As depicted in step 5 of FIG. 2B, one or more of the applications in the application stack 212 handle or process the message.

As depicted in step 6 of FIG. 2B, the MMC database 230 can then determine additional application data and log context data generated by the one or more applications handling the message. As depicted in step 7 of FIG. 2B, the application stack 212 then generates a reply to the MO message received by the messaging and application framework 210 and transmits the reply as a mobile terminated (MT) message via the aggregator 204. The messaging and application framework 210 then logs the MT message along with any additional meta-data added to the MT by the application stack 212 in the campaign analytics platform 260 of the messaging and application framework 210 and the runtime and configuration database 220.

Figure 2C:
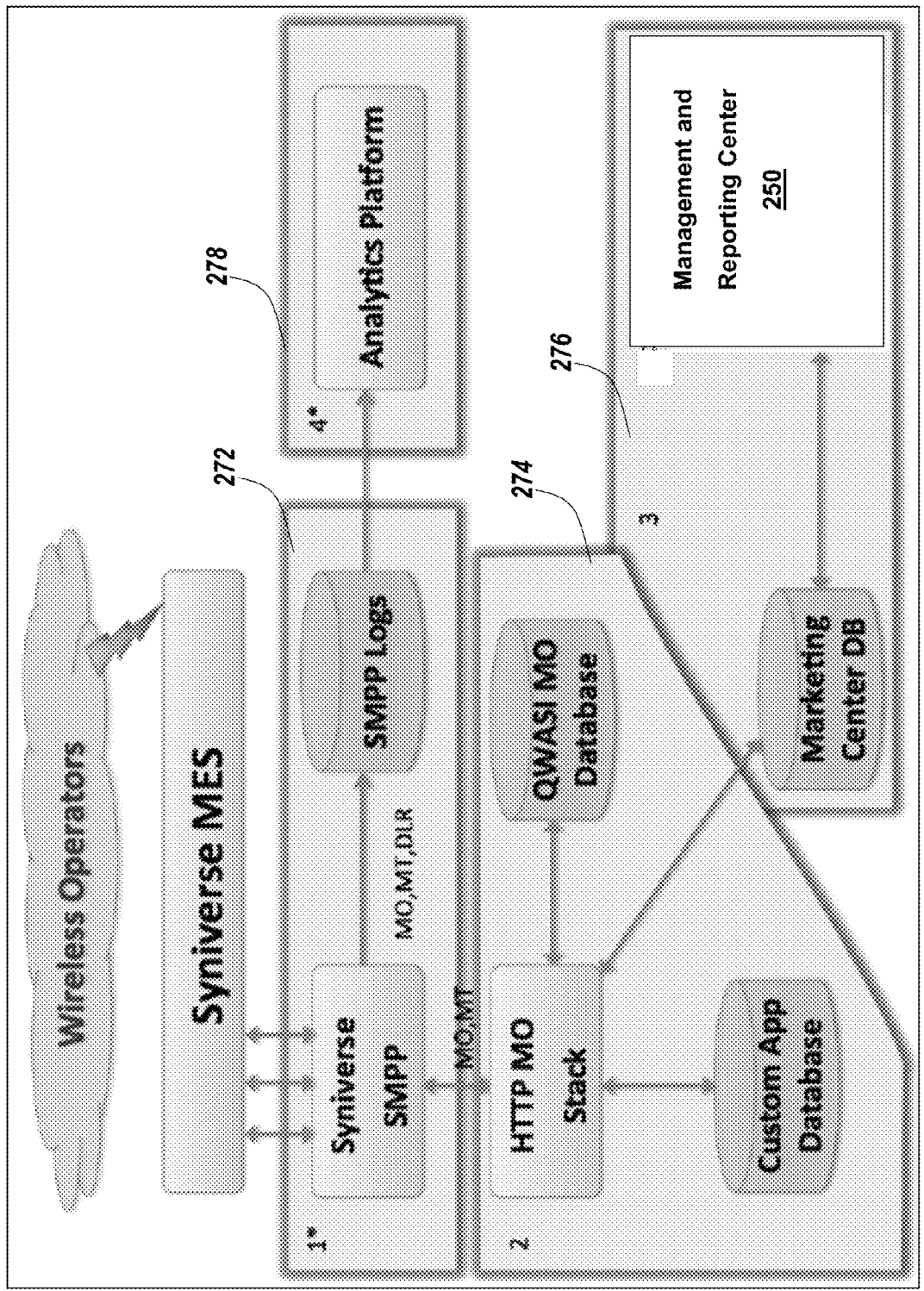
FIG. 2C is a block diagram depicting an embodiment of an aggregator implementing the communication technology platform.

FIG. 2C is a block diagram depicting an embodiment of an aggregator implementing the communication technology platform. The hardware architecture 270 comprises one or more servers for each client-application provider combination. In general, clients may have more than one server to enable the required level of throughput, performance and security. FIG. 2C shows a typical configuration for a very large volume client. In some implementations, the hardware architecture can be performed on a single server. In some implementations, the hardware architecture can be performed on more than one server. For example, in the implementation depicted in FIG. 2C, four separate servers are configured to form a part of the hardware architecture.

The first server 272 can be configured to handle the Short Message Peer-to-Peer (SMPP) protocol interface and log all the traffic for data analysis by the analytics platform. The traffic includes Mobile Originated (MO) messages, Mobile Terminated (MT) messages and Delivery Report (DLR) messages. The second server 274 can be configured to handle the MO stack and application databases. The second server 274 can be load balanced as needed for high volume. Although the custom app database is shown to reside on the second server, in some implementations, it may reside on the third server. The third server 276 includes a marketing center database and a mobile campaign manager, for example, the MMC or management and reporting center 250 as shown in FIG. 2B. The fourth server 278 can be configured to include the analytics platform 265.

C. Systems and Methods for Delivering Messages Received Via SMPP Protocol Over a Plurality of Delivery Channels Various embodiments disclosed herein are directed to methods and systems for delivering messages received via the Short Message Peer-to-Peer (SMPP) protocol over a plurality of delivery channels. A message delivery system acting as an intermediary between one or more clients and one or more consumers can be configured to establish a connection with the client via an SMPP protocol. In some implementations, the client may be a company, business or any other entity that may wish to send messages to one or more recipients. The consumers may be current, past or future customers of the client. In some implementations, the consumers may be associated with the client either as current, past or future users, members or subscribers, or through any other form of association in which the client and consumers may communicate with one another. The message delivery system can receive, from the client via the SMPP protocol, an SMPP request to deliver a message to at least one of a plurality of consumers. The request can include the message to be delivered and identify a delivery policy according to which the message is to be delivered to one or more consumers. The delivery policy can include one or more rules for delivering the message, including but not limited to identifying one or more target delivery channels through which to deliver the message, identifying a time at which to deliver the message, identifying one or more conditions for delivering the message, for example, a condition requiring that the consumer device be located within a particular geographic region, amongst other rules.

In some implementations, the message delivery system can inspect the request to identify the delivery policy. The message delivery system can then process the request and based on the target delivery channel through which to deliver the message identified in the delivery policy, transmit the message included within the request to the consumer in accordance with the delivery policy. In some implementations, the delivery channel can be a push notification delivery channel through which the message is delivered to a consumer device as a push notification via an application operating on the consumer device. In some implementations, the delivery channel can be a Short Message Service (SMS) delivery channel through which the message is delivered to a consumer device as an SMS message. In some implementations, the delivery channel can be an email delivery channel through which the message is delivered to a consumer device as an email message via a mail application. In some implementations, the delivery channel can be an instant messaging channel through which the message is delivered to a consumer device as an instant message via an instant messaging application.

In some implementations, the message delivery system can be configured to establish an SMPP connection with a client agent operating on a client, over which the message delivery system and the client can communicate. The client agent can be configured to generate an SMPP request that includes the message to be delivered as well as the delivery policy according to which the message is to be delivered. In addition, the message delivery system can be configured to communicate with an application operating on the consumer device through which the message delivery system can send push notifications to the consumer device. In some implementations, the message delivery system can establish a secure connection with the application and deliver push notifications through the secure connection. In some other implementations, the message delivery system can send push notifications through a third-party push notification service that is configured to send the push notification to the application operating on the consumer device.

Figure 3A:
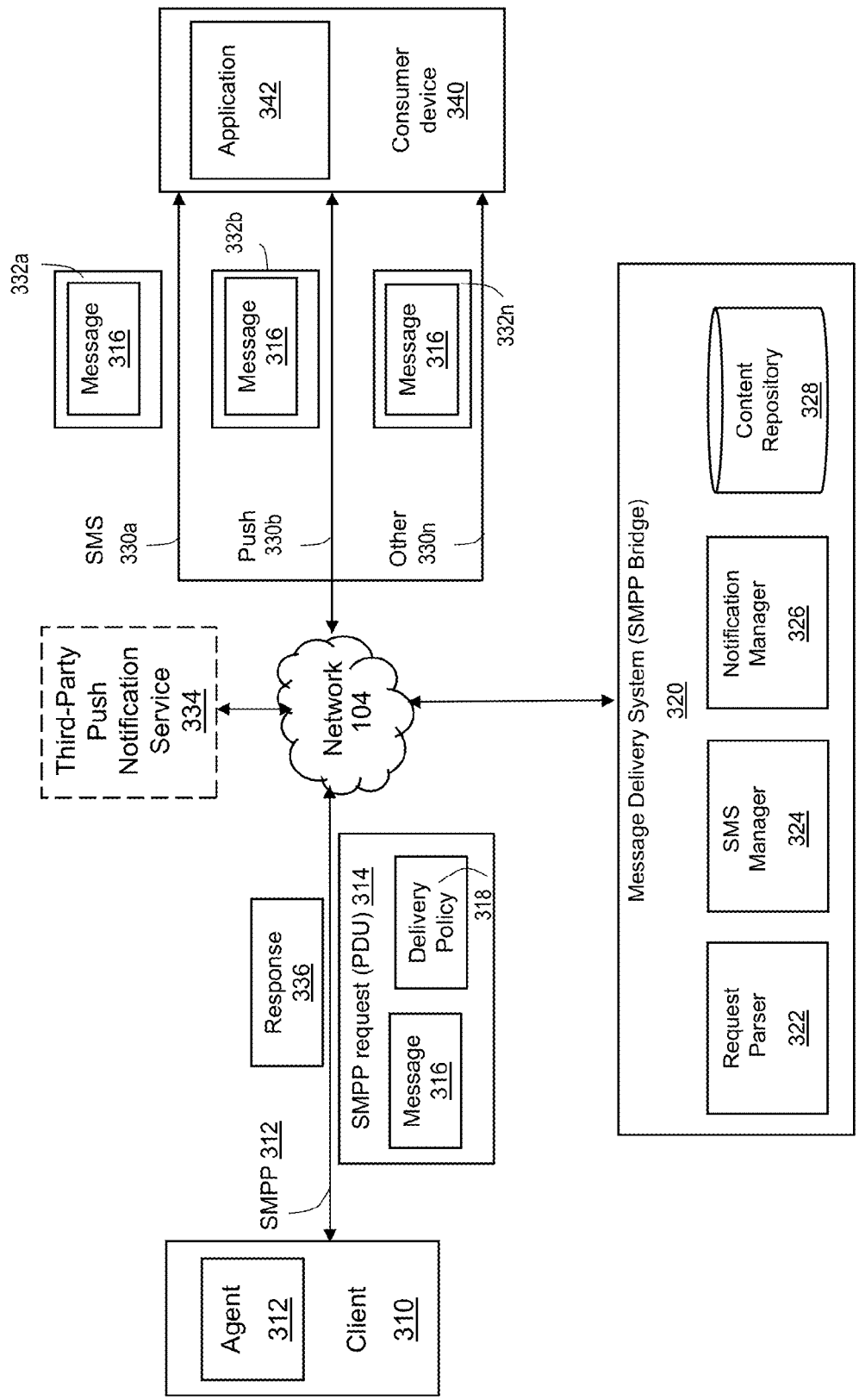
FIG. 3A is a block diagram illustrating a computer networked environment for delivering messages received via the SMPP protocol over one of a plurality of delivery channels.

FIG. 3A is a block diagram illustrating a computer networked environment for delivering messages received via the SMPP protocol over any of a plurality of delivery channels are provided in accordance with various embodiments. The environment includes a message delivery system 320 (e.g. a message deliverer) configured to allow one or more clients 310 to communicate with one or more consumers via consumer device 340 over one or more networks, such as the network 104.

In some implementations, a message deliverer can execute on a device intermediary between a client device and a plurality of consumer devices. For instance, the message delivery system 320 can be a standalone entity intermediary to the client and the consumers. In some implementations, the message delivery system 320 can operate on the client 310. In some implementations, the message delivery system 320 can operate on an entity intermediary to the client and the consumers, for example, on an aggregator, such as the aggregator 204 shown in FIGS. 2A and 2B, an SMSC or a push notification service.

A consumer can be an individual or entity associated with a consumer device 340, which can be configured to receive messages 316 from one or more clients 302 via the message delivery system 320. The consumer can have a particular relationship with the client. For example, the consumer can be an existing or potential customer of the client or current or potential user of the client's services, amongst others. In some implementations, the consumer device 340 can be configured to receive messages via an application 342 operating or executing on the consumer device 340. In some implementations, the application 342 is associated with the message delivery system 320 such that the message delivery system 320 is capable of sending messages to the consumer device 340 via the application 342. In some implementations, the consumer device 340 can be associated with one or more consumer identifiers that uniquely identify the consumer to the message delivery system 320. Examples of the consumer identifier can include one or more of a phone number, a network device identifier, such as a MAC address or a push token identifier associated with the application 342 operating on the consumer 340.

The message delivery system 320 may execute on one or more servers, such as the server 106 shown in FIG. 1A. The message delivery system 320, and any modules or components thereof, may comprise one or more applications, programs, libraries, services, processes, scripts, tasks or any type and form of executable instructions executing on one or more devices, such as servers. The message delivery system 320, and any modules or components thereof, may use any type and form of database for storage and retrieval of data. The message delivery system 320 may comprise function, logic and operations to perform any of the methods described herein.

The message delivery system 320 can include a memory having processor executable instructions stored thereon and a processor configured to execute the processor executable instructions stored on the memory. The message delivery system 320 may configure the processor to perform any of the methods described herein.

The message delivery system 320 can deliver messages received via an SMPP protocol over one or more delivery channels. The message delivery system 320 can serve as an SMPP bridge through which one or more clients 310 can communicate with one or more recipient consumer devices 340 using the SMPP protocol to send messages.

In some implementations, the message delivery system 320 may establish an SMPP connection with the client 310 device based on SMPP protocol, the SMPP connection for communicating SMS messages. In some implementations, the message delivery system 320 can establish an SMPP connection with the client 310 through which the client can send one or more requests 314 to deliver a message 316 to one or more consumer devices 340. In some implementations, the message delivery system 320 can establish an SMPP connection with a client agent 312 operating on the client 310.

The message delivery system 320 may receive, from the client device 310 over the SMPP connection, a first request, via the SMPP protocol, to deliver a message to at least one consumer device 340 of the plurality of consumer devices. The first request can include the message and a delivery policy. In some implementations, the delivery policy can specify one or more non-SMS delivery channels 330 through which to deliver the message.

The message delivery system 320 can be configured to deliver messages 316 to the consumer devices 340 over one or more delivery channels. In some implementations, the message delivery system may employ the services of an intermediary to deliver the message to the consumer devices 340. The intermediary can be a short message service center (SMSC) in situations where the message is to be delivered as an SMS message. The intermediary can be a third-party push notification service, for example, Apple Push Notification Service (APNS) or Google Cloud Messaging (GCM), in situations where the message is to be delivered as a push notification.

The message delivery system 320 can include a request parser 322, an SMS manager 324, a notification manager 326 and a consumer profile database 328. The message delivery system 320 can also include one or more additional modules configured to manage the delivery of messages across one or more additional delivery channels, including non-SMS delivery channels, for example, an email manager, a voice manager, amongst others. In some implementations, the non-SMS delivery channels can include a push notification delivery channel through which the message is delivered to a consumer device 340 as a push notification via an application operating on the consumer device, an instant messaging channel through which the message is delivered to a consumer device 340 as an instant message via an instant messaging application, among others.

The request parser 322 may comprise one or more applications, programs, libraries, services, processes, scripts, tasks or any type and form of executable instructions executing on one or more devices, and can be designed, constructed or configured to establish an SMPP connection with the client 310 (e.g. client device). The request parser 322 of the message delivery system 320 may establish an SMPP connection with the client device based on SMPP protocol. The SMPP connection can be established for communicating SMS messages. In some implementations, the SMPP connection can be established to allow the client device 310 to send requests to deliver notifications or messages to consumer devices via the message delivery system 320.

The SMPP protocol is an open, industry standard protocol designed to provide a flexible data communication interface for the transfer of short message data between entities, such as the client 310 and the message delivery system 320. The SMPP protocol can be based on pairs of request/response protocol data units (PDUs 314) or packets exchanged over OSI layer 4 connections. An SMPP PDU 314 can start with a header followed by a body. The header can include one or more fields. The fields can include a command length indicating the overall length of the PDU in octets, a command identifier identifying the SMPP operation, the command status indicating if the command is a request or a response and a sequence number used to correlate requests and response within an SMPP session. The header can include one or more other fields. The PDU body can include a message 316 to be delivered and can include information identifying a delivery policy 318 for delivering the message 316. In addition, the PDU 314 can include information identifying the sender of the PDU and information identifying the intended recipient of the PDU 314. In some implementations, the PDU 314 can also include information identifying the intended recipient of the message included within the PDU.

The request parser 322 can be configured to receive SMPP requests or PDUs 314 over the SMPP protocol. The received SMPP requests 314 can include one or more additional fields that can include additional information. These additional fields are sometimes referred to as Tag Length Value fields (TLVs). The TLVs can be used to extend the SMPP protocol with more advanced features. TLVs can be added as a byte stream at the end of the standard SMPP PDUs. In some implementations, the first two bytes can be used to identify the TLV, the third and fourth bytes can indicate the length of the actual data which follows directly after these bytes.

The request parser 322 can be configured to parse SMPP requests 314 received by the message delivery system. The requests 314 can be requests received from a client intended to be delivered to a mobile device, sometimes referred to as a mobile terminated (MT) request. The requests 314 can be requests received from a mobile device intended to be delivered to a client, sometimes referred to as a mobile originated (MO) request. The message delivery system 320 can also receive other types of requests, such as delivery receipt requests as well as responses to both MT and MO requests.

In some implementations, the request parser 322 may be configured to inspect a header of the first request and identify fields of the header of the first request. The request parser 322 can be configured to then determine, from values of the identified fields, the delivery policy according to which to deliver the message. In some implementations, the request parser 322 can analyze the TLVs associated with a received SMPP request 314 to determine how to process messages included within the SMPP request 314. In addition, the request parser 322 can be configured to parse information associated with the sender of the SMPP request 314, the intended recipients of the one or more messages included within the SMPP request, as well as other information. The request parser 322 can be configured to identify the sender of the SMPP request 314 by identifying a sending address associated with the SMPP request. In some implementations, the request parser 322 can identify the sender by determining a value stored in a TLV of the SMPP request. In some implementations, the request parser 322 can be configured to authenticate that a received PDU 314 originated from a client authorized to send PDUs to the message delivery system 320.

In some implementations, the request parser 322 can identify a delivery policy 318 associated with the request 314. In some implementations, the request parser 322 or the message delivery system 320 may identify, from the delivery policy in the first request, the one or more non-SMS delivery channels over which to deliver the message included in the request to the client device. In some implementations, the request parser 322 may identify the one or more non-SMS delivery channels. The delivery policy 318 can be included in one or more fields or TLVs associated with the SMPP request 314. The client agent operating on the client 310 can be configured to include the delivery policy 318 in the SMPP request 314 received by the request parser 322. The delivery policy 318 associated with a request can include one or more rules for delivering the message 316 included within the request 314. The delivery policy 318 can identify or specify one or more consumers to which the message 316 is to be delivered, the one or more target delivery channels 330a-330n through which the message 316 is to be delivered, the time at which the message 316 is to be delivered, and one or more additional conditions upon which the message is to be delivered, amongst others. In some implementations, the delivery policy can identify one or more of one or more consumer devices to which the message is to be delivered, one or more non-SMS delivery channels according to which the message is to be delivered, a time at which the message is to be delivered, a geographic location the consumer device has to be located within for the message to be delivered to the consumer device, among others.

In some implementations, the delivery policy 318 can specify a triggering condition, which when triggered, causes the message to be delivered. In some implementations, the delivery policy 318 can require the message delivery system 320 to deliver a message 316 upon the occurrence of a triggering event. The event can be associated with a consumer device 340 or an event unrelated to a consumer device. An example of an event associated with a consumer device can include the consumer device being located within a predefined geographic area. In some such implementations, the message delivery system 320 can be configured to receive geographic location information from the consumer device 340. In some implementations, the message delivery system 320 can retrieve such information through an application operating on the consumer device 340, which can be configured to provide geographic location information to the message delivery system 320. For situations in which the application collects and shares personal information about the consumer, the consumer may be provided with an opportunity to opt in/out of programs or features that may collect and share personal information, for example, information about a user's preferences or a user's current location. An example of an event unrelated to a consumer device can be a news related event. For instance, the event can be a stock price falling below a threshold price. This can trigger the delivery of a message from the client to the consumer device. For example, the client can be a stock advisor to the consumer and can send a message recommending the consumer to purchase the stock as the stock price is now below the threshold price. In some implementations, the message delivery system can be configured to receive information associated with such triggering events from the client itself or from one or more additional databases or servers, for instance, a stock price monitoring server. In some implementations, the delivery policy can specify an application executing on a mobile device (e.g. a consumer device 340) via which to present the message 316 as a notification on the consumer device 340. In some implementations, the delivery policy can identify a type of message included in the request. Message types can be classified based on the type of client, the identity of the client, a priority level of the message, among others.

The request parser 322 can be configured to determine one or more target delivery channels 330 through which the message 316 included within the SMPP request 314 is to be delivered. In some implementations, the request parser 322 can be configured to inspect the delivery policy 318 to determine the target delivery channel 330. Upon the request parser 322 determining the target delivery channel 330, the request parser 322 can invoke the appropriate delivery channel manager to process the request 314 and send the message 316 via the target delivery channel. For example, if the target delivery channel 330 is an SMS delivery channel 330a, the request parser 322 can invoke the SMS manager 324 to process the request. If the target delivery channel is a push notification channel 330b, the request parser 322 can invoke the notification manager 326 to process the request. In some implementations, the request parser 322 or the message delivery system 320 may invoke one or more non-SMS delivery channel managers, such as an email manager and a voice manager.

One or more of the SMS manager 324, notification manager 326, and one or more non-SMS delivery channel managers in the message delivery system 320 may transmit, a second request to deliver the message via the one or more non-SMS delivery channels to the at least one consumer device. In some implementations, one or more non-SMS delivery channels (which can include the notification manager 326) may transmit the second request. In some implementations, for the one or more non-SMS delivery channels, a second request to deliver the message can be delivered via the one or more non-SMS delivery channels to the at least one consumer device. In some implementations, the message delivery system 320 may transmit, for a first non-SMS delivery channel, a corresponding second request to a first entity configured to transmit the message to the consumer device via the first non-SMS delivery channel, and transmit, for a second non-SMS delivery channel, another corresponding second request to a second entity configured to transmit the message to the consumer device via the second non-SMS delivery channel. In some implementations, the one or more of the SMS manager 324, notification manager 326, one or more non-SMS delivery channel managers in the message delivery system 320 may transmit the message included in the second request to the consumer device 340 for presentation via an application 342 executing on the client device, the application 342 specific to the client device 340.

The SMS manager 324 may comprise one or more applications, programs, libraries, services, processes, scripts, tasks or any type and form of executable instructions executing on one or more devices, and can be designed, constructed or configured to manage the delivery of messages via SMS. The SMS manager 324 can be configured to generate an SMS message in response to the request parser 322 determining that a delivery policy of the request indicates that the message included within the request is to be delivered as an SMS message. The SMS manager 324 may be configured to send an SMS message to a consumer device via an SMSC or other intermediary device.

The SMS manager 324 can be configured to include the message 316 included within the SMPP request received from the client in the SMS message 332a. The SMS manager 324 can configure the SMS message 332a such that the SMS message 332a identifies the client as the sender of the SMS. The SMS manager 324 can include a phone number or short code associated with the client in the SMS message. In some implementations, the SMS manager 324 can be configured to generate an SMS message 332a that includes the short code associated with the message delivery system 320. In some such implementations, the SMS message 332a can include other information that identifies the client requesting the SMS message to be sent. For example, the SMS message can identify the client in the body of the message or can include an identifier in one of the fields of the SMS message. In this way, the message delivery system 320 can maintain fewer short codes than the number of clients it services. In other implementations, each client can have a dedicated short code.

The SMS manager 324 can also be configured to receive responses to the SMS messages 332a sent to the consumer devices 340. In some implementations, the responses include information that allows the SMS manager 324 to identify the SMS message to which the response corresponds. In some implementations, the SMS manager 324 can extract information from the response and have it delivered to the client via the established SMPP connection.

The notification manager 326 may comprise one or more applications, programs, libraries, services, processes, scripts, tasks or any type and form of executable instructions executing on one or more devices, and can be designed, constructed or configured to manage the delivery of notifications to one or more consumer devices 340. The notification manager 326 can be configured to manage the delivery of notifications 332a-332n across a wide variety of applications or platforms, including but not limited to SMS messages, push notifications for one or more applications, emails for email applications, social networking posts for social networking applications or programs, pages for pager-based applications, instant messages for instant messaging based applications, amongst others. The notification manager 326 can be configured to deliver the notifications 332a-332n over a plurality of different notification channels 330a-330n.

In some implementations, the notification manager 326 can be configured to generate a push notification request 332b in response to the request parser 322 determining that a message included in a received SMPP request is to be delivered as a push notification. The notification manager 326 can be configured to include the message 316 included within the SMPP request in the push notification request 332b. The notification manager 326 can configure the push notification request to identify the client that sent the corresponding SMPP request as the sender of the push notification request. In some implementations, the notification manager 326 can configure the push notification request to identify the message delivery system as the sender of the push notification request.

The notification manager 326 can send the push notification request to the consumer device 340 or to a third-party push notification service 334 through which push notifications can be delivered to the consumer device 340. Each consumer device 340 that utilizes the services of a third-party push notification service for delivering push notifications can establish an accredited and encrypted IP connection with the third-party push notification service and can receive notifications over this persistent connection. If a notification for an application 342 installed on the consumer device 340 arrives when that application 342 is not running, the consumer device 340 can alert the consumer associated with the consumer device 340 that the application 342 has data waiting for it. A provider, such as the message delivery system 320, can originate a push notification in the form of a push notification request. The message delivery system 320 can send the push notification to the third-party push notification service, for example, through a persistent and secure channel. When new data for a consumer device arrives, the message delivery system 320 can prepare and send a push notification request through the channel to the third-party push notification service, which can subsequently push the push notification to the intended consumer device.

The third-party push notification service 334 can transport and route a push notification from a given provider, such as the message delivery system 320 to a given device, such as a consumer device 340. A push notification can be a short message that includes two major pieces of data: a device token and the payload. The device token can be an opaque identifier of a consumer device that the third-party notification service gives to the consumer device 340 when it first connects with the third-party notification service. The consumer device 340 can share the device token with the message delivery system 320 associated with an application 342 operating on the consumer device 340. Thereafter, for the message delivery system 320 to deliver a push notification on the consumer device 340, the message delivery system 320 has to provide the device token along with the push notification to be delivered. The device token is the basis for establishing trust that the routing of a particular notification is legitimate. The payload can be information, for example, a JSON-defined property list, that specifies how a consumer of the consumer device is to be alerted.

The third-party push notification service 334 can decrypt the token using the token key, thereby ensuring that the notification is valid. The third-party push notification service then uses the device ID contained in the device token to determine the destination device for the notification.

The message delivery system 310 may be designed, constructed and/or configured to communicate with and/or interface to a plurality of different content repositories 328. In some embodiments, the message delivery system 310 can communicate with the content repositories 328 over one or more networks 104, such as to a remote server or cloud storage service. Content repositories 328 may include any type and form of storage or storage service for storing data such as digital content. Examples of such content repositories include servers or services provided by Dropbox, Box.com, Google, amongst others. In some embodiments, the content repositories are maintained by the message delivery system 310. In some embodiments, the content repositories are located local to the message delivery system 310.

In some implementations, the content repositories 328 can store content, including information associated with one or more clients and one or more consumers. A content repository, for example, a client content repository can include information associated with one or more clients, including client information, information relating to an SMPP protocol connection between the client and the delivery notification system, a consumer list of the client, client preferences, one or more notification policies, as well as a record of any messages received from or delivered to the client. Another content repository, for example, a consumer profile database can be configured to maintain consumer profiles for one or more consumers associated with one or more clients. The consumer profiles can include information related to notification channels associated with the consumers, preferences of the consumer, tokens associated with any push notification services through which push notifications are to be delivered to the consumer, telephone numbers, amongst others.

In some implementations, the client 310, via the client agent 312, can be configured to generate and transmit a request to deliver a message to one or more users. The client 310 can be configured to transmit the request to the message delivery system 320, which is configured to process the request and deliver the message to the users intended by the client. Client agent 312 may comprise one or more applications, programs, libraries, services, processes, scripts, tasks or any type and form of executable instructions executing on one or more devices, and can be designed, constructed or configured to perform various functions associated with generating and transmitting a request to deliver a message to one or more consumers. In some implementations, the client agent 312 is configured to establish a connection with the message delivery system 320. In some implementations, the client agent 312 is configured to establish an SMPP protocol connection with the message delivery system 320.

In some implementations, the client agent 312, in connection with the message delivery system 320 (e.g. message deliverer) may establish the SMPP connection. The client agent 312 may operate or execute on the client device 310. In some implementations, the processor of the message deliverer may establish the SMPP connection with the client agent 213.

The client agent 312 can be configured to present a user interface through which an operator associated with the client can interact with the client agent. In some implementations, the user interface can be configured to allow an operator at the client to create an SMPP request to deliver a message to one or more consumers. The user interface can provide options for selecting the delivery channel through which the message is to be delivered, the time at which it is to be delivered, one or more conditions or triggering events upon which the message is to be delivered, other particular delivery instructions including whether to request a read receipt delivery receipt responses, amongst others.

In some implementations, the client agent 312 can be configured to have one or more predefined rules for generating SMPP requests. These rules can be based on one or more triggering events. For example, using the example of a bank wishing to deliver messages to its customers, a client agent of the bank can be configured to monitor the bank accounts of the bank's customers. The client agent can further be configured to monitor for a triggering event, such as a bank account balance falling below $200. The client agent can further be configured to automatically generate an SMPP request including a message alerting the customer that their bank account balance has fallen below $200. Moreover, the client agent can be configured to include a delivery policy that may be specific to the customer or may be specific to the type of message indicating how to deliver the message to the customer. The client agent 312 can be configured to generate and send the SMPP request including the message and the appropriate delivery policy without any actions required by an operator at the client's site.

A consumer can be an individual or entity associated with a consumer device 340, which can be configured to receive messages 316 from one or more clients 302 via the message delivery system 320. The consumer can have a particular relationship with the client. For example, the consumer can be an existing or potential customer of the client or current or potential user of the client's services, amongst others. In some implementations, the consumer device 340 can be configured to receive messages via an application 342 operating on the consumer device 340. In some implementations, the application 342 is associated with the message delivery system 320 such that the message delivery system 320 is capable of sending messages to the consumer device 340 via the application 342. In some implementations, the consumer device 340 can be associated with one or more consumer identifiers that uniquely identify the consumer to the message delivery system 320. Examples of the consumer identifier can include one or more of a phone number, a network device identifier, such as a MAC address or a push token identifier associated with the application 342 operating on the consumer 340.

The consumer device 340 may comprise one or more applications, programs, libraries, services, processes, scripts, tasks or any type and form of executable instructions executing on one or more devices, and can be designed, constructed or configured to receive messages from a client through a plurality of delivery channels. For instance, the consumer device 340 may include an application operating on the recipient consumer device 340. The consumer device 340 can be configured to receive push notifications from the client. In some implementations, the consumer device 340 can process the received push notifications via an application operating on the consumer device. The application 342 can be a native application installed on the consumer device or a web-based application operating through a web-browser of the consumer device. The application can be running in the background of the computing device and can be configured to alert the consumer of a message received from the client. The application 342 can include instructions identifying the message delivery system 320. In some implementations, the application 342 can be configured to receive notifications sent from the message delivery system via a third-party push notification service. In some implementations, the message delivery system 320 can include a notification service that can directly send notifications to the consumer device on which the application is installed. In some implementations, the message delivery system 320 may deliver the message 316 towards the consumer device 340 such that a notification delivery application 342 executing on the consumer device receives the message and responsive to a consumer delivery policy, presents the notification on the consumer device 342 as one of a push notification or an instant message.

Figure 3B:
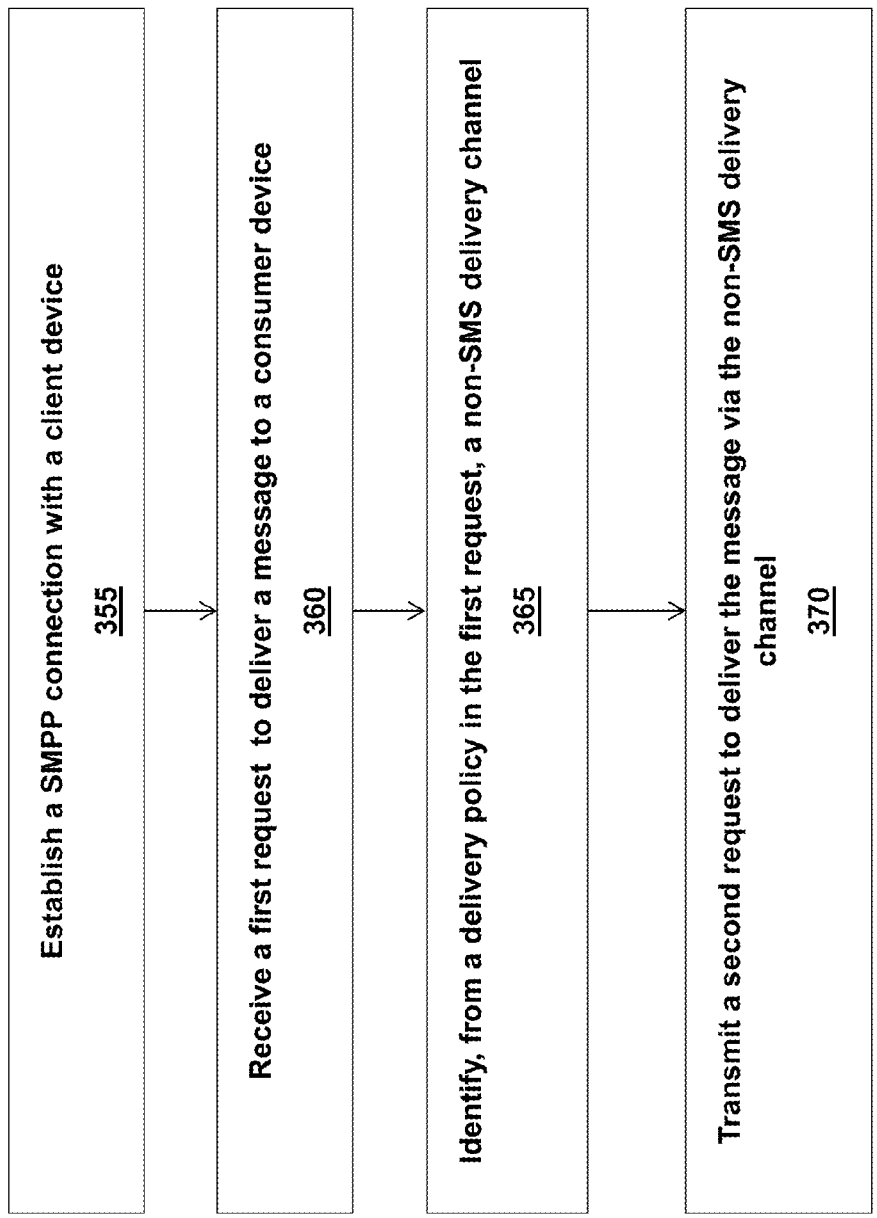
FIG. 3B is a block diagram illustrating a flow of a method for delivering messages received via the SMPP protocol over one of a plurality of delivery channels.

FIG. 3B is a block diagram illustrating a flow of a method for delivering messages, received via the SMPP protocol, over one of a plurality of delivery channels. In brief overview, the method includes establishing, by a message deliverer, an SMPP connection with a client device (step 355), receiving a first request to deliver a message to a consumer device (step 360), identifying, from a delivery policy in the first request, a non-SMS delivery channel (step 365) and transmitting a second request to deliver the message via the non-SMS delivery channel (step 370).

In further detail, the message delivery system can establish an SMPP connection with a client device (step 355). The SMPP connection is established between the message delivery system and the client device. The message delivery system can establish an SMPP connection with a client agent operating on the client device. In some implementations, the SMPP connection is established with the client device based on SMPP protocol. In some implementations, the SMPP connection is established for communicating short message service (SMS) messages from the client device to the message delivery system. In some implementations, the SMPP connection is established for receiving requests from the client device to deliver one or more messages to consumer devices to which the message delivery system serves as an intermediary. The messages can be delivered as SMS messages, push messages, instant messages, or in any other form that can be received by the consumer device. In some implementations, the client agent can send a bind request to open an SMPP session. The SMPP connection is established over an underlying transport layer connection between the client agent and the message delivery system. In some implementations, the message delivery system determines the identity of the client before establishing a connection with the client. In some implementations, the message delivery system can establish an SMPP connection with one or more clients that subscribe to services offered by the message delivery system. In some implementations, the message delivery system can maintain a list of clients that subscribe to services offered by the message delivery system.

In some implementations, the SMPP connection is established by a message deliverer configured on a device intermediary between a client device and a plurality of consumer devices. In some implementations, the message deliverer is the message delivery system. In some implementations, the message deliverer is configured to execute on the message delivery system. In some implementations, the message delivery system includes the message deliverer. In some implementations, at least one consumer device includes an application operating on the recipient consumer device. The message deliverer can transmit the message towards the consumer device such that a notification delivery application executing on the consumer device receives the message and responsive to a consumer delivery policy, presents the notification on the consumer device as one of a push notification or an instant message. The message delivery system can receive a first request to deliver a message to a consumer device (step 360). The first request can be an SMPP request from the client device. In some implementations, the first request can be received over the SMPP connection established between the client device and the message delivery system. The first request may be received via the SMPP protocol. The first request may be a request to deliver a message to at least one consumer device of the plurality of consumer devices. The first request can include a message and a delivery policy. The request can include additional information. For instance, the request can identify one or more consumer devices to which to deliver the message, the identity of the client sending the request, among others.

The message can correspond to the information the client would like to deliver to one or more consumers identified in the first request. The delivery policy can specify one or more non-SMS delivery channels through which to deliver the message. In some implementations, one of the non-SMS delivery channels includes one of a push notification delivery channel through which the message is delivered to a consumer device as a push notification via an application operating on the consumer device, or an instant messaging channel through which the message is delivered to a consumer device as an instant message via an instant messaging application. The delivery policy can provide information indicating one or more target delivery channels through which the message is to be delivered to the one or more consumers identified in the first request. The delivery policy can also identify the time at which the message is to be delivered as well include rules to hold the delivery until one or more triggering events or conditions occur. For instance, the delivery policy may specify a triggering condition which when triggered, can cause the message to be delivered.

The delivery policy can specify an application executing on the mobile device via which to present the message as a notification on the consumer device. The delivery policy can identify one or more of one or more consumer devices to which the message is to be delivered, one or more non-SMS delivery channels according to which the message is to be delivered, or a time at which the message is to be delivered. The request parser of the message delivery system can parse the request to identify the delivery policy and process the delivery of the message according to the delivery policy. In some implementations, the delivery policy is included in the header of the message. In some implementations, the delivery policy is stored in the message delivery system and is specific to the client. In some implementations, the delivery policy is stored in the message delivery system and is specific to the client-consumer device pair. In some implementations, the delivery policy is stored in the message delivery system and is specific to the message type. In some implementations, the request can include the message. The message delivery system can determine the delivery policy associated with the request or the message by performing a lookup in a database accessible by the message delivery system to determine a notification policy associated with the message, the client, the consumer device, or any combination thereof.

The message delivery system can identify, from the delivery policy included in or associated with the first request, the non-SMS delivery channel through which to deliver the message (step 365). The non-SMS delivery channel may be the delivery channel through which to deliver the message to the consumer device based on the delivery policy. The delivery policy can determine, for one or more consumers, one or more various delivery channels through which to deliver the message. In some implementations, the message deliverer may identify one or more non-SMS delivery channels. In some implementations, the delivery policy can be included in or identified by one or more TLVs of the SMPP request or PDU. The client agent can be configured to generate an SMPP request using TLVs that can be understood and processed by the message delivery system. The message delivery system can identify the delivery policy and determine one or more delivery channels through which to deliver the message to each of the consumers the SMPP request identifies as a recipient consumer. In some implementations, the message delivery system can further inspect a header of the first request, identify fields of the header of the first request, and determine from values of the identified fields, the delivery policy according to which to deliver the message.

The message delivery system can generate and transmit a second request to deliver the message via the non-SMS delivery channel (step 370). The second request can include the message and instructions for delivering the message to the recipient consumer device. In some implementations, the message delivery system transmits a second request to deliver the message via one or more non-SMS delivery channels. In some implementations, if the delivery channel through which the message is to be delivered is an SMS channel, the SMS manager can be configured to generate an SMS message and transmit the SMS message towards the recipient consumer device. The SMS message can include the message included in the SMPP request from the client. In some implementations, the message delivery system can send the SMS message to the consumer device via an SMSC configured to process the SMS message. In some such implementations, the message delivery system can establish an SMPP connection with the SMSC through which the SMS message can be transmitted. The SMSC can then deliver the SMS message to the intended recipient consumer. In some implementations, if the delivery channel through which the message is to be delivered is a push notification channel, the notification manager can be configured to generate a push notification request and transmit the push notification request towards the recipient consumer device. The push notification request can include the message to be delivered. In some implementations, the notification manager can deliver the push notification request to the consumer via a third-party push notification service. The third-party push notification service can be configured to transmit the message included in the second request to the consumer device for presentation via an application executing on the client device. The application can be specific to the client device. The push notification request can include the message to be delivered as well as a device token identifying the consumer device to which the message is to be delivered. In some implementations, the notification manager of the message delivery system can transmit a push notification request directly to the consumer device as long as the consumer device maintains a secure connection with the message delivery system over which the push notification request can be sent. In some implementations, the message delivery system can transmit, for a first non-SMS delivery channel, a corresponding second request to a first entity configured to transmit the message to the consumer device via the first non-SMS delivery channel. The message delivery system may also transmit, for a second non-SMS delivery channel, another corresponding second request to a second entity configured to transmit the message to the consumer device via the second non-SMS delivery channel. For instance, the message delivery system may transmit the message to a first entity to deliver the message via a push notification channel and transmit the message to a second entity to deliver the message via an instant messaging delivery channel.

D. Systems and Methods for Delivering Communications via an Application Provider Proxy Various embodiments disclosed herein are directed to methods and systems for delivering communications to one or more consumer devices via an application provider proxy. In some implementations, the application provider proxy can be the same as or similar to a message delivery system, such as the message delivery system 320 depicted in FIG. 3A. The application provider proxy can communicate with a notification delivery application installed and/or executing on one or more consumer devices. The notification delivery application can be configured to receive the push notifications and take one or more actions responsive to the push notifications. In some implementations, the notification delivery application can be configured to present the notifications at the consumer device in accordance with a consumer notification policy. The consumer notification policy can include one or more rules specifying the manner in which notifications can be presented. The application can be configured to take one or more actions responsive to presenting the notification. In some implementations, the application can be configured to take one or more actions responsive to presenting the notification at the consumer device and receiving a response from a consumer of the consumer device.

The application provider proxy can be configured to receive requests to deliver notifications to one or more consumer devices. The notifications can include messages that were included in the requests received by the application provider proxy. In some implementations, the requests can be received from one or more clients authorized to communicate with consumers to which the clients wish to send notifications. In some implementations, the application provider proxy can be configured to communicate with a message delivery application installed on a consumer device to which the notification is to be delivered. In some implementations, the application provider proxy may utilize the services of a third-party push notification service configured to deliver push notifications to the consumer device.

The message delivery application installed on the consumer device can receive a notification from the application provider proxy and execute one or more instructions responsive to receiving the notification. In some implementations, the message delivery application can be configured to perform one or more actions in response to a user of the consumer device taking an action in response to the notification received by the consumer device. These actions can correspond to opening a web browser and accessing a web page, opening a third-party application, amongst others.

In some implementations, the application provider proxy may deliver notifications in accordance with a consumer notification policy. The consumer notification policy can include one or more rules identifying a delivery channel through which to deliver the notification, conditions in which to hold the notification and conditions in which to release the notification for presentation, the manner in which the notification is to be presented on the consumer device, amongst others.

Figure 4A:
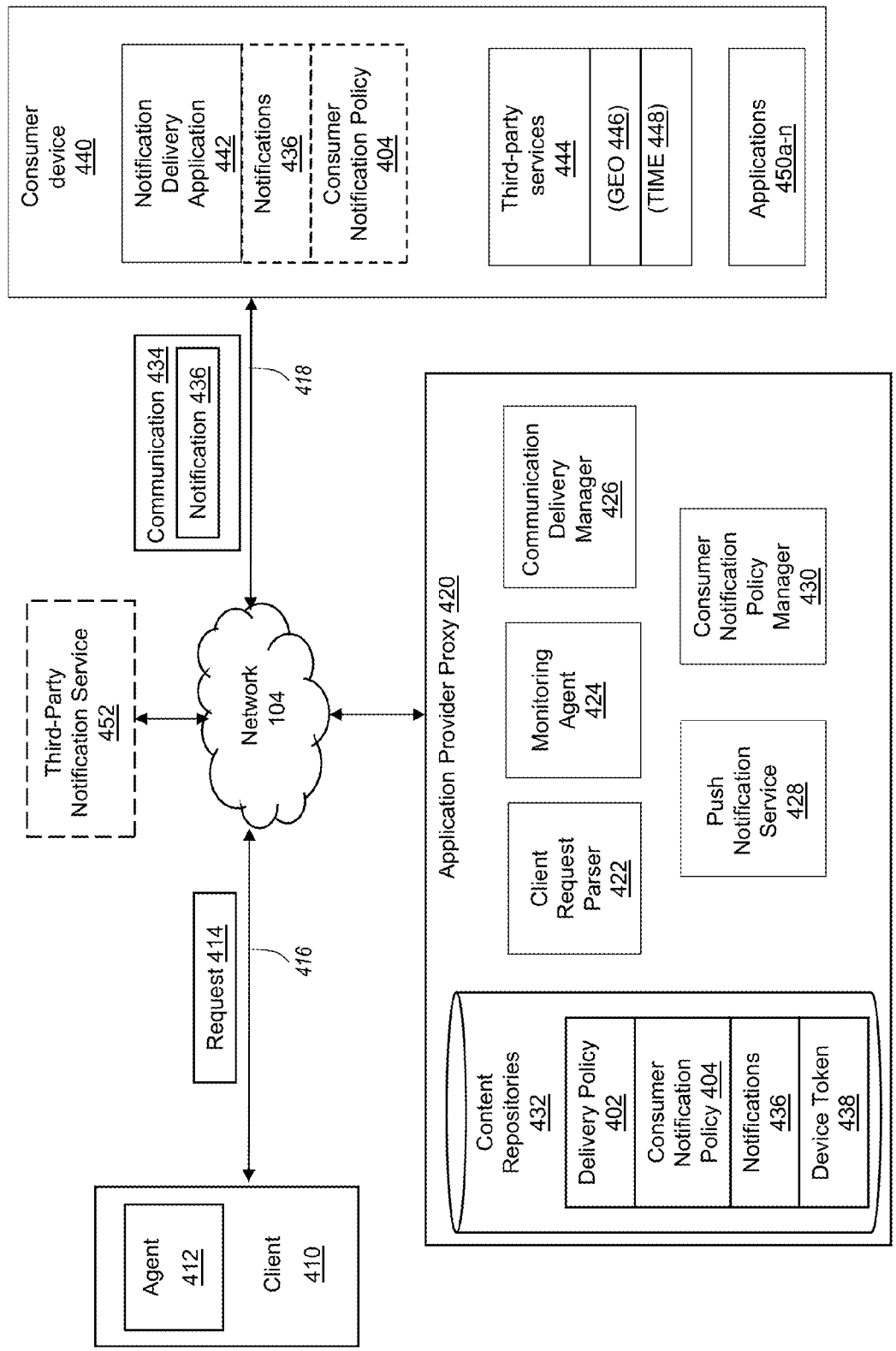
FIG. 4A is a block diagram illustrating a computer networked environment for delivering communications via an application provider proxy.

FIG. 4A is a block diagram illustrating a computer networked environment for delivering communications via an application provider proxy. The environment includes an application provider proxy 420 configured to serve as a proxy to an application provider. The application provider can provide an application for executing on a consumer device and the application provider proxy can serve as the proxy to the application provider such that notifications to be delivered to the application executing on the consumer device are provided by the application provider proxy. The application provider proxy 420 can send communications to one or more consumer devices 440 over one or more networks, such as the network 104. In some implementations, the application provider proxy 420 can be configured to communicate with one or more clients 410, such as via agent 412. The clients can send to the application provider proxy 420, one or more requests to deliver communications to the consumer devices 440. In some implementations, the consumer devices 440 may be associated with one or more consumers who may be past, existing or future customers, members, subscribers or users of the clients or the clients' services.

The client 410 can include an agent 412 that is configured to establish communications between the client 410 and the application provider proxy 420. In some implementations, the agent 412 can be the same or similar to the agent 312 described with respect to FIG. 3A.

The client 410, via the client agent 412, can be configured to generate and transmit a request 414 to deliver communications to one or more consumers. The client 410 can be configured to transmit the request 414 to the application provider proxy 420, which is configured to process the request 414 and deliver the communications 434 to the consumers intended by the client. Client agent 412 may comprise one or more applications, programs, libraries, services, processes, scripts, tasks or any type and form of executable instructions executing on one or more devices, and can be designed, constructed or configured to perform various functions associated with generating and transmitting a request to deliver communications to one or more consumers. In some implementations, the client 410 and the application provider proxy 420 can communicate via a communication path 416. In some implementations, the client agent 412 is configured to establish a connection with the application provider proxy 420. In some implementations, the client agent 412 is configured to establish an application layer protocol connection with the application provider proxy 420. In some implementations, the client agent 412 is configured to establish an SMPP protocol connection with the application provider proxy 420. In some implementations, the client agent 412 can communicate with the application provider proxy via a connectionless protocol.

The client agent 412 can be configured to present a user interface through which an operator associated with the client 410 can interact with the client agent 412. In some implementations, the user interface can be configured to allow an operator at the client 410 to create a request to deliver communications to one or more consumers. The user interface can provide options for selecting the delivery channel through which a communication is to be delivered, the time at which it is to be delivered, one or more conditions or triggering events upon which the communication is to be delivered, other particular delivery instructions including whether to request a read receipt delivery receipt responses, amongst others.

In some implementations, the client agent 412 can be configured to have one or more predefined rules for generating requests. These rules can be based on one or more triggering events. For example, using the example of a bank wishing to deliver messages to its customers, a client agent of the bank can be configured to monitor the bank accounts of the bank's customers. The client agent 412 can further be configured to monitor for a triggering event, such as a bank account balance falling below a predefined threshold value, for example, $200. The client agent can further be configured to automatically generate a request including a communication alerting the customer that their bank account balance has fallen below $200. Moreover, the client agent 412 can be configured to include a delivery policy that may be specific to the customer or may be specific to the type of communication indicating the manner in which to deliver the message to the customer. The client agent 412 can be configured to generate and send the communication and the appropriate delivery policy without any actions required by an operator at the client's site.

The application provider proxy 420 may execute on one or more servers, such as the server 106 shown in FIG. 1A. The application provider proxy 420, and any modules or components thereof, may comprise one or more applications, programs, libraries, services, processes, scripts, tasks or any type and form of executable instructions executing on one or more devices, such as servers. The application provider proxy 420, and any modules or components thereof, may use any type and form of database for storage and retrieval of data. The application provider proxy 420 may comprise function, logic and operations to perform any of the methods described herein.

In some implementations, the application provider proxy 420 can be configured to establish a connection 416 with one or more clients 410 through which the clients can send one or more requests 414 to deliver communications to one or more consumer devices 440. In some implementations, the application provider proxy 420 can establish the connection 416 with the client agent 412 operating on the client 410.

The application provider proxy 420 can be configured to deliver communications 434 that can include one or more notifications 436 to the consumer devices 440 via one or more delivery channels 418 between the application provider proxy 420 and the consumer device 440. In some implementations, the application provider proxy 420 can include a push notification service 428 configured to deliver push notifications to one or more applications operating on the consumer devices 440. In some implementations, the push notification service 428 can operate as or on a standalone entity in communication with the application provider proxy 420 but configured to deliver push notifications to one or more applications operating on the consumer device 440. In some implementations, the application provider proxy 420 may employ the services of an intermediary to deliver the communications 434 to the consumer devices 440. The intermediary can be a short message service center (SMSC) in situations where the communication 434 is to be delivered as an SMS message. The intermediary can be a third-party push notification service 452, for example, Apple Push Notification Service (APNS) or Google Cloud Messaging (GCM), in situations where the communications 434 is to be delivered as a push notification.

In some implementations, the application provider proxy 420 can be a standalone entity intermediary to the clients 410 and the consumers 440. In some implementations, the application provider proxy 420 can operate on a client 410. In some implementations, the application provider proxy 420 can operate on an entity intermediary to a client and the consumers, for example, on an aggregator, such as the aggregator 204 shown in FIGS. 2A and 2B, an SMSC or a push notification service, such as the third-party push notification service 452.

The application provider proxy 420 can include a client request parser 422, a communication delivery manager 426, a monitoring agent 424, a push notification service 428, a consumer notification policy manager 430 and one or more content repositories. The content repositories can include a notification log configured to store one or more notifications 436 delivered to the consumer devices, a client delivery policy database configured to one or more delivery policies 402, and a consumer notification policy database configured to store one or more consumer notification policies 404. In some implementations, the content repositories 432 can include a database that stores device tokens 438 corresponding to the consumer devices 440 to which notifications 436 can be delivered. The application provider proxy 420 can also include one or more additional modules configured to facilitate the delivery of communications across one or more delivery channels 418, for example, a push notification channel, an SMS channel, an email channel, a social networking application channel, an instant messaging channel, among others.

The client request parser 422 may comprise one or more applications, programs, libraries, services, processes, scripts, tasks or any type and form of executable instructions executing on one or more devices, and can be designed, constructed or configured to receive one or more requests from one or more clients 410 with which the application provider proxy 420 can establish connections. The request 414 can include a request to send a communication 434 to one or more consumer devices 440. The request 414 can be sent from the client 410 in response to a triggering event. The triggering event can be any event or occurrence for which the client 410 wishes to send a communication to one or more consumer devices 440. The client request parser 422 can be configured to parse the received client request 414. The client request parser 422 can identify one or more intended recipients to which to deliver a communication 434 in response to the received request 414.

In some implementations, the client request parser 422 can also identify a delivery policy 402 associated with the request 414. In some implementations, the request 414 can include the delivery policy 402 according to which a communication 434 is to be delivered to the consumer device 440. In some implementations, the client request parser 422 can maintain one or more delivery policies 402 associated with clients sending the request 414. In some implementations, the delivery policy 402 can be specific to a particular client 410 such that only requests received from a particular client can be handled according to the delivery policy 402. In some other implementations, the delivery policy 402 can be common to a plurality of clients such that requests received from more than one client can be handled according to the same delivery policy 402.

The client request parser 422 can identify a delivery policy 402 according to which a communication 434 based on the request 414 is to be delivered to one or more consumer devices 440 from the request 414 itself or from settings associated with the client 410 sending the request 414. In some implementations, the client request parser 422 can analyze the contents of the request 414 to identify the delivery policy 402.

In some implementations, the client request parser 422 can identify a delivery policy 402 according to which the communication 434 to the consumer devices 440 is to be delivered. In some implementations, the client request parser 422 can identify the delivery policy 402 based on the type of communication 434 to be delivered or the type of request 414 received. In some implementations, the client request parser 422 can identify the delivery policy 402 for delivering a communication 434 to the one or more intended consumer devices 440 based on the type, identity or number of consumer devices 440 to which the communication is to be delivered.

A delivery policy 402 can include one or more rules for delivering a communication associated with the received request, including but not limited to identifying one or more target delivery channels through which to deliver the communication, identifying a time at which to deliver the communication, identifying one or more conditions for delivering the communication, for example, a condition requiring that the consumer device be located within a particular geographic region, amongst other conditions or rules.

In some implementations, the delivery policy 402 can include one or more rules for determining when to deliver a communication. In some implementations, the rules can specify to deliver a communication upon the occurrence of a triggering event. The event can be associated with the one or more consumer devices 440 to which the communication is intended to be delivered or an event unrelated to the consumer devices 440. An example of an event associated with a consumer device can include the consumer device being located within a predefined geographic area. An example of an event unrelated to the consumer devices 440 can be a weather related event, for example, it's raining at a particular location, or a holiday related event, for example, it's Christmas day.

In some implementations, the client request parser 422 can also be configured to send responses to the client 410 in response to receiving the request 414. In some implementations, the client request parser 422 can send a response to the client in response to processing the request 414. In some implementations, the client request parser 422 can send a response to the client 410 in response to receiving confirmation that the request was successfully processed. In some implementations, the request is successfully processed upon successfully delivering a communication to the consumer device 440. In some implementations, the request 414 is successfully processed upon receiving confirmation that the communication was successfully delivered to the consumer device. In some implementations, the request 414 is successfully processed when a notification 436 has been released for viewing on the consumer device. In some implementations, the notifications 436 may be delivered to the consumer device 440 but not released for presentation until later. As will be described below, the notification or other communications may be released for presentation on the consumer device 440 upon one or more conditions of a consumer notification policy 404 being met.

Generally, the consumer notification policy 404 can include one or more rules identifying a delivery channel through which to deliver the notification, conditions in which to hold the notification and conditions in which to release the notification for presentation, the manner in which the notification is to be presented on the consumer device, amongst others.

In some implementations, the consumer notification policy 404 and the delivery policy 402 can both include one or more rules for delivering a communication, including but not limited to identifying one or more target delivery channels through which to deliver the communication, identifying a time at which to deliver the communication, identifying one or more conditions for delivering the communication, for example, a condition requiring that the consumer device be located within a particular geographic region, amongst other conditions or rules. In some implementations, the basic distinction between the consumer notification policy 404 and the delivery policy 402 is that the consumer notification policy is specific to a consumer device 440 or may be specified by a consumer associated with the consumer device. Conversely, the delivery policy can be specific to a particular client or may be specified by a client 410 of the application provider proxy 420.

In some implementations, the consumer notification policy 404 can apply to one or more communications received by the consumer device 440 from the application provider proxy 420. The consumer notification policy can relate to one or more of delivering communications, handling notifications, presenting notifications, amongst others. The consumer notification policy may specify the delivery channel via which a communication is to be delivered. For example, the consumer notification policy can specify that a communication is to be delivered via SMS if the Wi-Fi component of the communication device is switched off or a communication is to be delivered via push notification if the Wi-Fi component of the communication device is switched on.

The consumer notification policy 404 can include one or more rules or conditions for holding notifications. In some implementations, the consumer notification policy 404 can include one or more rules or conditions for holding notifications at the application provider proxy 420 or at the consumer device 440. The notifications 436 may be held until the conditions for releasing the notification 436 have been satisfied. In some implementations, these conditions can be based on information received from the consumer device 440 or the application provider proxy 420. In some implementations in which the notifications are held at the consumer device 440, the application provider proxy 420 may send one or more instructions to release notifications for presentation by communicating with the notification delivery application of the consumer device.

The consumer notification policy 404 can include one or more rules for releasing the notifications 436 for presentation on the consumer device 440. In some implementations, these rules may be based on one or more conditions, events or settings related to the consumer or the consumer device. For instance, push notifications received by the consumer device 440 may be held until one or more conditions are met. Examples of conditions can be based on location, time, third-party source information, amongst others. For example, the consumer notification policy 404 may include a rule to hold notifications between the hours of 12:30 pm and 2 pm. Another consumer notification policy may include a rule to hold notifications while the consumer device is determined to be in Europe.

In some implementations, the consumer notification policy 404 can include one or more rules that may apply a particular consumer notification policy to every notification from the application provider proxy 420 or a subset of the notifications from the application provider proxy 420. In some implementations, the consumer notification policy 404 can be specific to a particular notification, a particular notification type, notifications received within a particular time period, notifications generated in response to specific client requests, amongst others. In some implementations, the consumer notification policy 404 can be specific to notifications related to particular types of information, for example, bank account information, health related information or social media information. In some implementations, the consumer notification policy 404 can be specific to notifications related to a particular client or client type, for example, social media clients, finance related clients, retail clients, amongst others.

The consumer notification policy 404 can include one or more rules indicating the manner in which to present the notifications. For example, a notification can be presented in one or more ways, including but not limited to playing a sound, generating a vibration, presenting a visual notification on the screen, or any combination thereof. In some implementations, the consumer notification policy 404 can identify the type of sound to play the type of vibration to generate and the type of visual notification to provide. In some implementations, the consumer notification policy 404 can include one or more rules that are specific to a particular client, request type, consumer device state, consumer device location, time of day, current phone settings, amongst others.

In some implementations, a monitoring agent 424 may operate on the application provider proxy 420 and can determine that a triggering event has occurred. In some implementations, the monitoring agent 424 can be a program, script, application or other software construct can be configured to monitor or track activities on behalf of one or more clients 410 and can be configured to determine if a triggering event has occurred. In some such implementations, the monitoring agent 424 can serve as a client agent specific to a particular client. In some implementations, the monitoring agent 424 can be an agent that monitors activities associated with more than one client. In some implementations, the monitoring agent 424 can be configured to monitor databases, records, files, transactions or other information of one or more clients to determine that a triggering event has occurred. In some such implementations, the client has authorized the monitoring agent 424 of the application provider proxy 420 access to such information.

In implementations that utilize a monitoring agent, the application provider proxy 420 can be configured to generate and deliver communications to one or more consumer devices 440 without having to receive a request, such as the request 414 or other instructions from a client, such as the client 410. In some implementations, the application provider proxy 420 may be authorized to take such actions on behalf of the clients responsive to predetermined events whose occurrence is detected by the monitoring agent 424. In some such implementations, the application provider proxy 420 can receive a policy from a client that may identify the role of the application provider proxy 420 and the monitoring agent 424, provide authorization to monitor or track information associated with the client and include one or more conditions upon which the application provider proxy 420 can deliver a communication to the consumer devices 440 on behalf of the client 410. The authorization can include authorization to access secure confidential databases, servers and other records of the client.

The communication delivery manager 426 may comprise one or more applications, programs, libraries, services, processes, scripts, tasks or any type and form of executable instructions executing on one or more devices, and can be designed, constructed or configured to deliver communications 434 to the consumer device 440 over one or more delivery channels 418. In some implementations the communication delivery manager 426 can be configured to generate and deliver communications to the consumer devices responsive to the application provider proxy 420 receiving a request, such as the request 414 from a client. In some implementations, the communication delivery manager 426 can be configured to generate and deliver communications to the consumer devices in response to the application provider proxy 420 determining that a triggering event has occurred, which warrants the application provider proxy 420 to deliver one or more communications to one or more consumer devices 440.

The communication delivery manager 426 can be configured to generate the communications 434 to be delivered to one or more consumer devices. The communication 434 can include a notification 436 to be delivered to the consumer device 440. The notification can be an SMS message, a push notification, an email, a social networking post, a tweet, an instant message or any other type of communication that can be received at the consumer device.

The communication delivery manager 426 can be configured to generate a communication based on one or more of the delivery policy 402 of the client 410, the consumer notification policy 404 associated with a particular consumer associated with a consumer device 440 to which the communication 434 is to be delivered and the type of communication to be delivered. The communication 434 can include information needed to deliver the communication 434 to the intended consumer device 440 and a notification 436. The information can include a consumer device identifier, such as a token, a phone number, an email address associated with an email account of the consumer of the consumer device 440, an instant messaging identifier associated with an instant messaging account of the consumer of the consumer device 440, a social networking profile identifier associated with a social networking account of the consumer of the consumer device 440, amongst others.

The notification 436 included in the communication 436 can be an SMS message, an email message, a social networking post, a tweet, or any other type of notice, message or notification. In some implementations, the notification 436 can be a push notification. The push notification can be directed towards a consumer device 440 and may identify a particular application installed on the consumer device. In some implementations, the push notification 436 can include a payload and a device token 438. In some implementations, the payload can be a JSON-defined property list that specifies how the consumer associated with the consumer device 440 is to be alerted. The payload can include an alert message to display on the consumer device and a graphical icon of the application, an identifier identifying an icon associated with the application or a graphical icon associated with the client requesting to deliver the notification. In some implementations, the payload can include additional information that can be used by the application to which the notification is directed to take additional actions. For example, the payload can include information that can be used to identify a sound to play when the notification is received, amongst others.

In some implementations, the device token 438 can contain information that enables the push notification service to locate the consumer device to which to deliver the notification and can be used to authenticate the routing of the notification. The device token 438 can be issued by the push notification service delivering the notification. To deliver push notifications to the consumer device, the application provider proxy can deliver the communications by including the device token 438 along with each notification to be delivered. In some implementations, the device token 438 can be the basis for establishing trust that the routing of a particular notification is legitimate.

In some implementations, the application provider proxy 420 can only push notifications to a particular application installed on the consumer device 440. The particular application can act as an agent of the application provider proxy 420 and can be configured to receive the push notifications from the application provider proxy 420. An example of the particular application is the notification delivery application 442 installed on the consumer device 440, details of which are provided below. In some implementations, the device token 438 issued by the push notification service 428 or the third-party notification service 452 may be unique to the particular application of the consumer device 440. The device token 438 can be an opaque identifier of a consumer device that a notification service, such as notification service 428 or 452 gives to a consumer device 440 when the notification service first connects with consumer device 440. The consumer device 440 can then share the device token 438 with the notification delivery application 442 installed on the consumer device 440. The notification delivery application 442 can then share the device token 438 with the application provider proxy 420.

In some implementations in which the push notification service 428 can be a part of the application provider proxy 420, the push notification service 428 can make the device token 438 accessible to the application provider proxy 420, for example, by storing the device token 438 in the content repository 432 or providing it to the application provider proxy 420. In some implementations in which the push notification service is a third-party push notification service 452, the application provider proxy 420 can be configured to receive the device token 438 associated with the consumer device 440 from the consumer device 440. In some applications, for the application provider proxy 420 to send notifications to the consumer device 440, the application provider proxy 420 may include the device token 438 issued to the notification delivery application 442 along with each notification.

The push notification service 428 may comprise one or more applications, programs, libraries, services, processes, scripts, tasks or any type and form of executable instructions executing on one or more devices, and can be designed, constructed or configured to deliver communications that include push notifications to the notification delivery application 442 of the consumer device 440. The push notification service 428 can be configured to establish a secure delivery channel with the notification delivery application 442 through which the communications can be delivered. The notification delivery application 442 can be installed on the consumer device 440 and include instructions that configure the notification delivery application 442 to receive communications from the push notification service 428. When the notification delivery application 442 is installed on the consumer device, the push notification service 428 can assign the notification delivery application a device token that is unique to the notification delivery application installed on the consumer device. In this way, the device token can be used to uniquely route communications to the notification delivery application installed on a particular consumer device.

In some implementations in which the client requesting to deliver a communication to a consumer device has an applicable delivery policy 402 and the consumer device 440 intended to receive the communication has an applicable consumer notification policy, the application provider proxy 420 may be configured to implement both the delivery policy 402 and the consumer notification policy 404 to the extent that the policies do not contradict one another. If one or more conditions of the delivery policy 402 and the consumer notification policy 404 do contradict one another, the condition of the consumer notification policy 404 contradictory to the condition of the delivery policy 402 may override the condition of the delivery policy 402 for that particular consumer device. In some implementations, however, the condition of the delivery policy 402 contradictory to the condition of the consumer notification policy 404 may override the condition of the delivery policy 402. This determination can be made by the communication delivery manager 426.

In some implementations, the communication delivery manager 426 can be configured to deliver push notifications to one or more consumer devices 440 without considering the consumer notification policy 404 associated with the consumer device 440 to which the notifications 436 are being delivered. In some such implementations, the consumer device 440, via the notification delivery application 442 installed thereon, can be configured to manage the holding, releasing and presentation of the notifications in accordance with the consumer notification policies 404 associated with the consumer device.

In some implementations, the communication delivery manager 426 can be configured to deliver a push notification to a consumer device in accordance with the consumer notification policy 404 associated with consumer device 440 to which the push notifications is being delivered.

The consumer device 440 can be configured to generate or create a consumer notification policy 404. A consumer, via the consumer device 440, can create, modify or delete one or more consumer notification policies 404 and can also determine priority levels of one or more of the consumer notification policies 404. In some implementations, the consumer can set one or more rules according to which a particular consumer notification policy can be implemented. The consumer may interact with the notification delivery application via the consumer device to create, modify or delete the consumer notification policies 404.

The push notification service 428 can be configured to deliver push notifications in response to a consumer notification policy 404 of the consumer device to which the push notifications are being delivered. In some implementations, the communication delivery manager 426 can be configured to work with the push notification service 428 to deliver the push notifications to the consumer device.

In some implementations, the application provider proxy 420 can be configured to send notifications via a third-party notification service 452. The third-party notification service 452 can be a short message service center (SMSC), an email server or exchange, an instant messaging server or a third-party push notification service, for example, Apple Push Notification Service (APNS) or Google Cloud Messaging (GCM).

The consumer notification policy manager 428 may comprise one or more applications, programs, libraries, services, processes, scripts, tasks or any type and form of executable instructions executing on one or more devices, and can be designed, constructed or configured to manage the consumer notification policies 404 associated with the consumer devices. In some implementations, the consumer notification policy manager 428 can manage consumer notification policies 404 of consumer devices on which the notification delivery application 442 is installed. The consumers can create, modify or delete their consumer notification policies 404 via the notification delivery application.

The consumer notification policy manager 430 can be configured to store the consumer notification policies 404 in storage of the application provider proxy or on a memory accessible by the application provider proxy. In some implementations, the consumer notification policies 404 can be stored in a content repository, such as the content repository 432.

The consumer notification policy manager 430 can be configured to provide one or more consumer notification policies 404 to the communication delivery manager. In some implementations, the consumer notification policy manager 430 can determine which consumer notification policy to implement for a particular request. In some implementations, the consumer notification policy manager 430 can identify the request for which the notification is being generated and determine, for example, one or more of the client associated with the request, the type of request, the contents of the request or information associated with the consumer device, such as the consumer device's current location, time, or other information received from third-party services operating on the consumer device. The consumer notification policy manager can then determine which consumer notification policy to implement based on the determination. In some implementations, the communication delivery manager 426 or the notification delivery application 424 may perform one or more of the functions performed by the consumer notification policy manager 430.

The application provider proxy 420 may be designed, constructed and/or configured to communicate with and/or interface to a plurality of different content repositories, such as the content repository 432. The content repository 432 can be configured to store one or more delivery policies 402 and consumer notification policies 404.

In some embodiments, the application provider proxy 420 can communicate with the content repositories over one or more networks 104, such as to a remote server or cloud storage service. The content repositories may include any type and form of storage or storage service for storing data such as digital content. Examples of such content repositories include servers or services provided by Dropbox, Box-.com, Google, amongst others. In some embodiments, the content repositories are located local to the application provider proxy 420. In some embodiments, the content repositories are maintained by the application provider proxy 420.

In some implementations, the content repositories can store content, including information associated with one or more clients and one or more consumers. A content repository, for example, a client content repository can include information associated with one or more clients, including client information, information relating to a connection between the client and the application provider proxy 420, a consumer list of the client identifying one or more consumers to which the client may communicate, client preferences, one or more client notification delivery policies, as well as a record of any messages received from or delivered to the client. Another content repository, for example, a consumer profile database can be configured to maintain consumer profiles for one or more consumers associated with one or more clients. The consumer profiles can include information related to notification channels associated with the consumers, preferences of the consumer, tokens associated with any push notification services through which push notifications are to be delivered to the consumer, telephone numbers, amongst others.

The consumer device 440 may comprise one or more applications, programs, libraries, services, processes, scripts, tasks or any type and form of executable instructions executing on one or more devices, and can be designed, constructed or configured to receive messages from a client through a plurality of delivery channels. The consumer device 440 can be configured to receive communications from the application provider proxy. The communications can be received one or more delivery channels, including but not limited to SMS, push notifications, email, instant messaging, social networking posts, tweets, amongst others. As described above, in some implementations, the delivery channel via which the consumer device can receive communications can be based in part on a delivery policy of the client or a consumer notification policy 404.

The consumer device 440 can be configured to include the notification delivery application 442. The consumer device 440 can also be configured to utilize, execute or include one or more services, such as third party services 444, a location service 446, a time service 448, amongst others. In some implementations, the consumer device 440 can be configured to include one or more applications 450*a*-450*n*.

In some implementations, the consumer device 440 can process the received push notifications via the notification delivery application 442 operating on the consumer device 440. The notification delivery application 442 can be a native application installed on the consumer device or a web-based application operating through a web-browser of the consumer device. The notification delivery application 442 can be running in the background of the computing device and can be configured to alert the consumer of a notification received from the client 410 via the application provider proxy 420. The notification delivery application 442 can include instructions identifying the application provider proxy 420. In some implementations, the notification delivery application 442 can be configured to receive notifications sent from the application provider proxy 420 via a third-party push notification service. In some implementations, the application provider proxy 420 can include a notification service that can directly send notifications to the consumer device on which the notification delivery application 442 is installed.

The notification delivery application 442 may comprise one or more libraries, services, processes, scripts, tasks or any type and form of executable instructions executing on the consumer device on which the notification delivery application 442 is installed, and can be designed, constructed or configured to manage the processing and handling of one or more notifications 436 and one or more consumer notification policies 404. The notification delivery application 442 can be configured to receive push notifications from the application provider proxy via one or more delivery channels 418. In some implementations, the notification delivery application 442 can be configured to process the received push notifications according to one or more consumer notification policies 404 of the consumer device or the notification delivery application 442 installed on the consumer device. In some implementations, the consumer may be able to select one or more consumer notification policies 404 to be implemented for handling notifications. In some implementations, the consumer may select one or more consumer notification policies 404 to be implemented for handling certain notification types.

In some implementations, the notification delivery application 442 can process the push notifications by identifying one or more consumer notification policies 404 applicable to the push notification, determining that the conditions of the consumer notification policies 404 have been met, and releasing the notifications for presentation on the consumer device upon determining that the conditions have been met. In some implementations, the notification delivery application 442 can be configured to hold the notifications in a notification queue. In some implementations, the notification delivery application 442 can be configured to release notifications from the queue as the conditions of the consumer notification policy applicable to the notification are met. In some implementations, the notification delivery application 442 can release the push notifications for presentation on the consumer device. In some implementations, the push notifications can be presented by displaying a notification on the display screen of the consumer device, by playing a sound or generating a vibration. In some implementations, the push notifications can be presented by launching an application.

In some implementations, the notification delivery application 442 can be configured to take additional actions in response to identifying an action taken on the notification being presented. For example, the notification delivery application 442 may identify that the notification has been selected. In some implementations, upon identifying that an action has been taken, the notification delivery application 442 can be configured to perform one or more actions. Examples of the actions can include launching an application, launching a browser, directing the browser to a particular web page, accessing one or more services, amongst others.

In some implementations, the notification delivery application 442 can be configured to perform one or more actions by receiving additional information from the application provider proxy 420. In some implementations, the notification delivery application 442 can be configured to make an API call or pull information from the application provider proxy 420. In some implementations, the application provider proxy 420 can provide further instructions to the notification delivery application 442 via a separate delivery channel upon receiving a pull request from the notification delivery application 442. The instructions can include one or more actions to take by the notification delivery application 442. In some implementations, the actions can be taken by the notification delivery application 442 in response to identifying an action has been taken in response to the notification being presented.

In some implementations, the notification delivery application 442 can identify one or more consumer notification policies 404 applicable to the push notification by identifying the content of the push notification. In some implementations, the content of the push notification can include or identify the client associated with the push notification, the type of notification, the purpose of the notification and the actions that will be performed by the consumer device in response to processing the push notification. Examples of the actions that can be performed can include launching a third-party application, launching a browser, launching a media player, launching one or more services of the consumer device, amongst others. The applications 450a-450n can be applications installed on the consumer device and may be third-party applications. In some implementations, these applications may be associated with one or more of the clients from which requests are received by the application provider proxy 420. In some such implementations, the notifications can be configured to launch an application of the client with which the notification is associated. In some implementations, the notifications can be configured to launch one of the applications 450a-450n. In some implementations, the application can be a browser through which a consumer can access the internet. In some implementations, the notifications can be configured to launch a browser application and go to a specific web page.

A consumer can be an individual or entity associated with a consumer device 340, which can be configured to receive communications 434 from the application provider proxy 420. The consumer can have a particular relationship with the client. For example, the consumer can be an existing or potential customer of the client or current or potential user of the client's services, amongst others. In some implementations, the consumer device 440 can be configured to receive messages via a notification delivery application 442 operating on the consumer device 440. In some implementations, the notification delivery application 442 is associated with the application provider proxy 420 such that the application provider proxy 420 is capable of sending communications to the consumer device 440 via the notification delivery application 442. In some implementations, the consumer device 440 can be associated with one or more consumer identifiers that uniquely identify the consumer to the application provider proxy 420. Examples of the consumer identifier can include one or more of a phone number, a network device identifier, such as a MAC address or a push token identifier associated with the notification delivery application 442 operating on the consumer device 340.

Figure 4B:
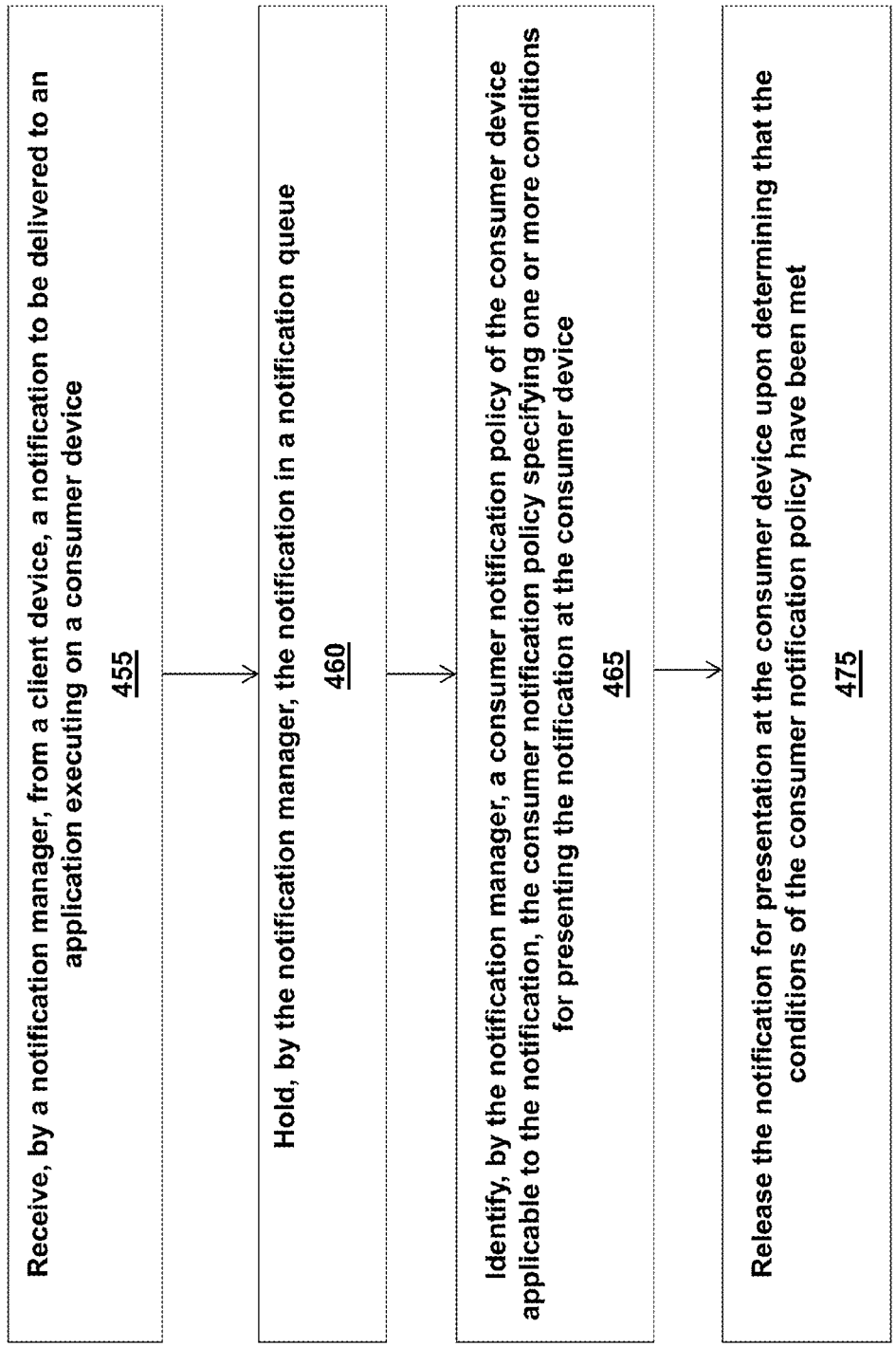
FIG. 4B is a block diagram illustrating a flow of a method for delivering communications via an application provider proxy.

FIG. 4B is a block diagram illustrating a flow of a method for delivering communications via an application provider proxy. In brief overview, the method includes receiving, by a notification manager, from a client device, a notification to be delivered to an application executing on a consumer device (step 455), holding, by the notification manager, the notification in a notification queue (step 460), identifying, by the notification manager, a consumer notification policy of the consumer device applicable to the notification, the consumer notification policy specifying one or more conditions for presenting the notification at the consumer device (step 465), and releasing, by the notification manager, from the notification queue, the notification for presentation at the consumer device upon determining that the conditions of the consumer notification policy have been met (step 470).

In further detail, the notification manager, receives, from a client device, a notification to be delivered to an application executing on a consumer device (step 455). In some implementations, the notification manager is configured on a device intermediary to the client device and a plurality of consumer devices including the consumer device. In some implementations, the notification manager is configured on the application provider proxy. In some implementations, the notification manager is configured on the consumer device. In some implementations, the notification manager can be executing on both the application provider proxy and on each of the consumer devices to which the notification manager can deliver notifications.

In some implementations in which the notification manager is executing on the application provider proxy, the application provider proxy and the client device can communicate over an SMPP connection established between the application provider proxy and the client device. The client device can transmit a request to the notification manager to deliver a notification to one or more consumer devices. In some implementations, the request can identify a delivery policy according to which to deliver the notification to the consumer devices. In some implementations, the notification manager can receive the request and identify one or more consumer devices to which to send the notification.

In some implementations, the client device can generate and transmit the request to deliver the notification responsive the occurrence of an event or condition. In some implementations, the notification manager can receive a notification to be delivered to an application executing on the consumer device responsive to identifying the occurrence of an event or condition. In some implementations, the occurrence of an event can include receiving a request from a client requesting to send a communication to the consumer device. In some such implementations, the client can send a request to the notification manager to deliver a notification to a consumer device. In some implementations, the client device can transmit the request via the client agent of the client device. In some implementations, the notification manager can identify an occurrence of an event by monitoring activities at or related to a particular client device and detecting that a triggering event has occurred. In some such implementations, the notification manager may need authorization to monitor activities at or related to the particular client. In some implementations, the notification manager can identify the occurrence of an event based on one or more third-party sources, for example, a weather source. In one example, the notification manager can identify that a hurricane is approaching a particular geographic area. This can be an event for which a notification can be delivered to consumer devices in the particular geographic area to seek shelter as a hurricane is approaching. In one specific example, the notification manager can either receive a request from a client to notify a consumer of a low account balance via a push notification. The notification manager can determine the identity of the consumer and/or an associated consumer device of the consumer to which to deliver a push notification.

The notification manager holds the notification in a notification queue (step 460). In some implementations, the notification can be held in the notification database or stored in a notification queue. In some implementations, the notification manager executing on the application provider proxy can store the notifications in a data store of the application provider proxy. In some implementations in which the notification manager is executing on the consumer device, the notifications can be stored in the notification queue or database locally on the consumer device. In some implementations, notifications that are delivered to the consumer device can be stored in a notification database along with a record associated with the notification. In some implementations, the notifications can be push notifications.

In some implementations, the notification manager can deliver the notification to the consumer device where the notification is held by a notification delivery application executing on the consumer device. In some such implementations, the notification manager can deliver the notification without determining if the conditions of the consumer notification policy have been met. In some implementations, the notification delivery application can hold the notifications and determine if the conditions of the consumer notification policy have been met. In some implementations, the notification delivery application can store the notifications on the consumer device until the notifications are delivered. In some implementations, the notifications stored on the consumer device may only be stored for a predetermined period of time. If the notifications are not delivered before the predetermined period of time lapses, the notifications can be removed from storage and the delivery notification application can notify the application provider proxy that the notification was not successfully presented.

The notification manager can identify a consumer notification policy of the consumer device applicable to the notification (step 465). The consumer notification policy can specify one or more conditions for presenting the notification at the consumer device. In some implementations, the notification manager can identify the consumer notification policy of the consumer device applicable to the notification by inspecting the request to deliver the notification and identifying a consumer device to which to deliver the notification. Upon determining the identity of the consumer device, the notification manger can determine if the consumer device has an associated consumer notification policy. In some implementations, the consumer device can establish a consumer notification policy via the notification delivery application executing on the consumer device or by communicating with the notification manager. In some implementations, the notification manager can store the consumer notification policy in a data store. In some implementations, the notification manager can store the consumer notification policy in such a way so as to be able to perform a lookup to determine if the consumer device has an associated consumer notification policy. In some implementations, the consumer notification policies of multiple consumer devices are stored in a database accessible by the notification manager.

In some implementations, the consumer notification policy can be specific to a particular client. In some implementations, the consumer notification policy can be specific to a particular geographic location, time of day, or mode in which the consumer device is operating. In some implementations, the consumer notification policy can specify one or more conditions for presenting the notification at the consumer device. These conditions may be specific to a particular client, type of notification, time of day, date, geographic location of the consumer device, or other events or conditions that can be identified, detected or otherwise receivable by the notification manager.

In some implementations, the notification manager can receive a request from the client to deliver a notification to the consumer device and upon receiving the request, the notification manager can identify a consumer notification policy associated with the consumer device that is applicable to the notification being delivered. In some implementations, the notification manager can identify the one or more consumer devices to which the notification is to be delivered and perform a lookup to identify one or more consumer notification policies associated with the consumer devices. The notification manager can perform a lookup in a consumer notification policy database to identify the consumer notification policies. Upon identifying the consumer notification policies, the notification manager can determine which of the one or more identified consumer notification policies may be applicable. The notification manager can determine a consumer notification policy that may be applicable based on the type of notification to be delivered. Following the example described above, the notification manager can identify a consumer notification policy associated with the consumer device of the consumer having a low account balance by performing a lookup. In some implementations, the notification manager may determine a consumer notification policy based on the type of notification to be delivered. In some implementations, the consumer notification policy may include one or more rules identifying a delivery channel through which to deliver the notification, one or more conditions in which to hold the notification, one or more conditions in which to release the notification for presentation, or the manner in which the notification is to be presented on the consumer device. In some implementations, the conditions can be based on a location of the consumer device, activity performed on the consumer device, or a time associated with the consumer device. In some implementations, the consumer notification policy can include one or more rules identifying a time at which to deliver the communication, such as a push notification, identifying one or more conditions for delivering the communication, for example, a condition requiring that the consumer device be located within a particular geographic region, amongst other conditions or rules.

In some implementations, the notification can be a push notification to be delivered to the notification delivery application installed on the consumer device. The notification manager can identify the conditions associated with the consumer notification policy and determine if the conditions have been met. This can include receiving information from one or more services, including third-party services, or monitoring one or more other sources of information. In some implementations, the conditions can be based on the consumer device. In some such implementations, the notification manager can receive information related to the consumer device via the notification delivery application installed on the consumer device or via third-party sources monitoring the consumer device. Examples of information used to determine if the conditions have been met include geographic location of the consumer device, time at the location of the consumer device, weather at the location of the consumer device, account related information associated with the consumer at one or more clients, stock prices, news alerts, commodity prices, or any other information that can be received by the consumer device.

In some implementations in which the notification manager delivers the notification to the notification delivery application where the notifications are held until conditions of the consumer notification policy have been met, the notification delivery application can determine if the conditions of the consumer notification policy have been met. In some implementations, the notification delivery application can determine that the conditions of the consumer notification policy have been met by performing some of the functionality that the notification manager performs when determining if the conditions of the consumer notification policy have been met. In some implementations, the notification delivery application can determine that the conditions of the consumer notification policy have been met by receiving one or more instructions from the notification manager indicating that the conditions of the consumer notification policy have been met. In some implementations, the notification manager can determine that the conditions of the consumer notification policy have been met by first identifying one or more conditions of the consumer notification policy and then determining, for at least one of the conditions, that the condition is based on a triggering event. The notification manager can then receive information associated with the triggering event and determine, from the received information, that the triggering event has occurred. For instance, if the triggering event to provide the notification according to the consumer notification policy is when a stock price of the stock goes below $50, the notification manager may receive information from a third-party stock information content provider that the stock price went below $50.

In some implementations, the notification manager releases, by the notification manager, from the notification queue, the notification for presentation at the consumer device upon determining that the conditions of the consumer notification policy have been met (step 470). In some implementations, the notification can be a push notification released for presentation at the consumer device via the notification delivery application. In some implementations, the notification manager can determine that the rules of the consumer notification policy have been met. In some implementations, the notification manager can deliver the notification to the notification delivery application executing on the consumer device, where the notification delivery application can present the notification in accordance with the notification presentation rules specified in the consumer notification policy. In some implementations, the notification can be presented in accordance with the delivery policy specified by the client associated with the notification to be delivered. As described above, the notification can be delivered responsive to receiving a request from the client. In some such implementations, the delivery policy of the client can include one or more conditions according to which notification are to be delivered and presented.

Following the example described above, once the rules of the consumer notification policy have been met, the application provider proxy can release the push notification for presentation at the consumer device. The consumer device can receive the push notification from the notification manager via a push notification server. In some implementations, the push notification can be held at the notification delivery application. In some such implementations, the push notification can be presented once the rules of the consumer notification policy have been met. Upon presenting the push notification, the consumer can access the push notification. In some implementations, responsive to the consumer accessing the push notification, the notification delivery application can send a request to the application provider proxy for additional instructions corresponding to the push notification. In turn, the application provider proxy can identify the consumer device requesting information and determine that the consumer associated with the push notification has a low account balance. In some implementations, the notification manager can then send additional instructions to the notification delivery application of the consumer device instructing the notification delivery application to launch a mobile application of the client, which will show the current account balance of the consumer. In some other implementations, the notification manager can send instructions to perform one or more other actions, such as launching a web browser, amongst others.

Through the teachings disclosed herein, clients can deliver messages to one or more consumers across multiple delivery channels by establishing an SMPP connection with the message delivery system and sending an SMPP request that includes a message and a delivery policy providing instructions for delivering the message to the one or more consumers.

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A method for delivering messages received via a short message peer-to-peer (SMPP) protocol over one of a plurality of delivery channels, comprising:

establishing, by a message deliverer on a device intermediary between a client device and a plurality of consumer devices, a short message peer-to-peer (SMPP) connection with the client device based on SMPP protocol, the SMPP connection for communicating short message service (SMS) messages;

receiving, by the message deliverer, from the client device over the SMPP connection, a first request, via the SMPP protocol, to deliver a message to at least one consumer device of the plurality of consumer devices, the first request including the message and a delivery policy specifying one or more non-SMS delivery channels through which to deliver the message;

identifying, by the message deliverer, from the delivery policy in the first request, the one or more non-SMS delivery channels; and transmitting, by the message deliverer, for the one or more non-SMS delivery channels, a second request to deliver the message via the one or more non-SMS delivery channels to the at least one consumer device;

wherein transmitting the second request includes transmitting, by the message deliverer, for a first non-SMS delivery channel, a corresponding second request to a first entity configured to transmit the message to the consumer device via the first non-SMS delivery channel and transmitting, by the message deliverer, for a second non-SMS delivery channel, another corresponding second request to a second entity configured to transmit the message to the consumer device via the second non-SMS delivery channel.

2. The method of claim 1, wherein the one of the non-SMS delivery channels includes one of a) a push notification delivery channel through which the message is delivered to a consumer device as a push notification via an application operating on the consumer device; or b) an instant messaging channel through which the message is delivered to a consumer device as an instant message via an instant messaging application.

3. The method of claim 1, wherein establishing, by the message deliverer, the SMPP connection with the client device includes establishing the SMPP connection with a client agent operating on the client device.

4. The method of claim 1, wherein the at least one consumer device includes an application operating on the recipient consumer device, and wherein transmitting the second request includes transmitting, by the message deliverer, the message towards the consumer device such that a notification delivery application executing on the consumer device receives the message and responsive to a consumer delivery policy, presents the notification on the consumer device as one of a push notification or an instant message.

5. The method of claim 1, further comprising:
inspecting a header of the first request;
identifying fields of the header of the first request; and
determining, from values of the identified fields, the delivery policy according to which to deliver the message.

6. The method of claim 1, wherein the delivery policy specifies a time at which to deliver the message, or a triggering condition, which when triggered, causes the message to be delivered.

7. The method of claim 1, wherein the delivery policy specifies an application executing on the mobile device via which to present the message as a notification on the consumer device.

8. The method of claim 1, wherein the delivery policy identifies one or more of a) one or more consumer devices to which the message is to be delivered; b) one or more non-SMS delivery channels according to which the message is to be delivered; or c) a time at which the message is to be delivered.

9. The system of claim 8, wherein to establish, by the message deliverer, the SMPP connection with the client device, the processor establishes the SMPP connection with a client agent operating on the client device.

10. The method of claim 1, wherein transmitting the second request including the message towards the at least one consumer device includes transmitting the second request to a third-party push notification service configured to transmit the message included in the second request to the consumer device for presentation via an application executing on the client device, the application specific to the client device.

11. A system for delivering messages received via a short message peer-to-peer (SMPP) protocol over one of a plurality of delivery channels, the system comprising:

a message deliverer executing on a device intermediary between a client device and a plurality of consumer devices, the message deliverer including a memory having processor executable instructions stored thereon and a processor to execute the processor executable instructions stored on the memory to cause the message deliverer to establish a short message peer-to-peer (SMPP) connection with the client device based on SMPP protocol, the SMPP connection for communicating short message service (SMS) messages;

receive, from the client device over the SMPP connection, a first request, via the SMPP protocol, to deliver a message to at least one consumer device of the plurality of consumer devices, the first request including the message and a delivery policy specifying one or more non-SMS delivery channels through which to deliver the message;

identify, from the delivery policy in the first request, the one or more non-SMS delivery channels; and transmit, for the one or more non-SMS delivery channels, a second request to deliver the message via the one or more non-SMS delivery channels to the at least one consumer device; and wherein to transmit the second request, the message deliver to transmit a corresponding second request to a first entity configured to transmit the message to the consumer device via the first non-SMS delivery channel; and transmit, for a second non-SMS delivery channel, another corresponding second request to a second entity configured to transmit the message to the consumer device via the second non-SMS delivery channel.

12. The system of claim 11, wherein the one of the non-SMS delivery channels includes one of a) a push notification delivery channel through which the message is delivered to a consumer device as a push notification via an application operating on the consumer device; or b) an instant messaging channel through which the message is delivered to a consumer device as an instant message via an instant messaging application.

13. The system of claim 11, wherein the at least one consumer device includes an application operating on the recipient consumer device, and wherein transmitting the second request includes transmitting, by the message deliverer, the message towards the consumer device such that a notification delivery application executing on the consumer device receives the message and responsive to a consumer delivery policy, presents the notification on the consumer device as one of a push notification or an instant message.

14. The system of claim 11, wherein the message deliverer to:
   inspect a header of the first request;
   identify fields of the header of the first request; and
   determine, from values of the identified fields, the delivery policy according to which to deliver the message.

15. The system of claim 11, wherein the delivery policy specifies a time at which to deliver the message, or a triggering condition, which when triggered, causes the message to be delivered.

16. The system of claim 11, wherein the delivery policy specifies an application executing on the mobile device via which to present the message as a notification on the consumer device.

17. The system of claim 11, wherein the delivery policy identifies one or more of a) one or more consumer devices to which the message is to be delivered; b) one or more non-SMS delivery channels according to which the message is to be delivered; or c) a time at which the message is to be delivered.

18. The system of claim 11, wherein to transmit the second request including the message towards the at least one consumer device, the second request is transmitted to a third-party push notification service that transmits the message included in the second request to the consumer device for presentation via an application executing on the client device, the application specific to the client device.

* * * * *